(12) United States Patent
Jiang et al.

(10) Patent No.: US 12,235,793 B2
(45) Date of Patent: Feb. 25, 2025

(54) PROGRAMMABLE SPATIAL ARRAY FOR MATRIX DECOMPOSITION

(71) Applicant: Intel Corporation, Santa Clara, CA (US)

(72) Inventors: Long Jiang, Beijing (CN); Xu Zhang, Beijing (CN); Hong Cheng, Beijing (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/017,077

(22) PCT Filed: Sep. 25, 2020

(86) PCT No.: PCT/CN2020/117932
§ 371 (c)(1),
(2) Date: Jan. 19, 2023

(87) PCT Pub. No.: WO2022/061781
PCT Pub. Date: Mar. 31, 2022

(65) Prior Publication Data
US 2023/0297538 A1  Sep. 21, 2023

(51) Int. Cl.
*G06F 15/80* (2006.01)
*G06F 17/16* (2006.01)

(52) U.S. Cl.
CPC .......... *G06F 15/8092* (2013.01); *G06F 17/16* (2013.01)

(58) Field of Classification Search
CPC .............................. G06F 15/8092; G06F 17/16
See application file for complete search history.

(56) References Cited

U.S. PATENT DOCUMENTS

| | | | | |
|---|---|---|---|---|
| 5,727,229 A | * | 3/1998 | Kan | G06F 9/30036 712/E9.034 |
| 7,606,207 B2 | * | 10/2009 | Becker | G06F 17/16 370/335 |
| 8,812,576 B1 | | 8/2014 | Mauer | |
| 10,824,584 B1 | * | 11/2020 | Noguera Serra | G06F 15/80 |
| 2005/0111405 A1 | * | 5/2005 | Kanterakis | H04B 1/71075 375/E1.031 |

(Continued)

OTHER PUBLICATIONS

International Search Report and Written Opinion for PCT/CN2020/117932 mailed Jun. 23, 2022, 4 pages.

*Primary Examiner* — Farley Abad
(74) *Attorney, Agent, or Firm* — Jordan IP Law, LLC

(57) ABSTRACT

Programmable spatial array processing circuitry may be programmable to perform multiple different types of matrix decompositions. The programmable spatial array processing circuitry may include an array of processing elements. When programmed with a first instructions, the array performs a first type of matrix decomposition. When programmed with second instructions, the array performs a second type of matrix decomposition. Individual processing elements of the programmable spatial array processing circuitry may avoid having individual instruction memories. Instead, there may be an instruction memory that provides a portion of the first instructions or a portion of the second instructions sequentially to one processing element of a row of processing elements to sequentially propagate to other processing elements of the row of processing elements.

22 Claims, 28 Drawing Sheets

(56) References Cited

U.S. PATENT DOCUMENTS

| | | | |
|---|---|---|---|
| 2009/0216821 A1* | 8/2009 | Nakamura | G06F 17/16 |
| | | | 708/446 |
| 2011/0007850 A1 | 1/2011 | Cao | |
| 2012/0078988 A1 | 3/2012 | Miller | |
| 2014/0019500 A1* | 1/2014 | Fitton | G06F 17/00 |
| | | | 708/201 |
| 2017/0085358 A1* | 3/2017 | Huberman | H04B 7/0456 |
| 2019/0042539 A1* | 2/2019 | Kalsi | G06F 7/5443 |
| 2019/0179868 A1 | 6/2019 | Ahmadi | |
| 2020/0279169 A1 | 9/2020 | Hoskins | |

\* cited by examiner

PROGRAMMABLE SPATIAL ARRAY FOR MATRIX DECOMPOSITION

CROSS-REFERENCE TO RELATED APPLICATIONS

This application is a U.S. national stage filing of PCT Application No. PCT/CN2020/117932, filed Sep. 25, 2020, entitled "Programmable Spatial Array for Matrix Decomposition," which is incorporated by reference herein in its entirety for all purposes.

BACKGROUND

The present disclosure relates generally to a programmable spatial array that can rapidly perform different types of matrix decomposition.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

Integrated circuit devices are found in numerous electronic devices, many of which may perform machine learning or use wireless communication. A type of computation known as a matrix decomposition is widely used in wireless communication, machine learning, and other areas. For instance, multiple-input multiple-output (MIMO) wireless communication in 5G wireless systems, multivariate linear regressions in machine learning, systems of linear equations, matrix inversions and determinant calculations, and many others involve performing matrix decompositions. Different types of matrix decompositions include LU decomposition, QR decomposition, and Cholesky decomposition.

Matrix decompositions are more complicated than matrix multiplication. The latter may generally use multiplication and addition operations and may have little or no data dependency among operations. Matrix decompositions, on the other hand, may have many data dependencies. This may cause one operation to have to wait for the result of another operation to be ready, which makes it difficult to handle data in parallel. Moreover, matrix decomposition usually has arithmetic operations other than multiplication, such as division and square root. As a consequence, an integrated circuit that performs matrix decompositions may use specialized circuitry that is quite complex and may support just one type of matrix decomposition.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
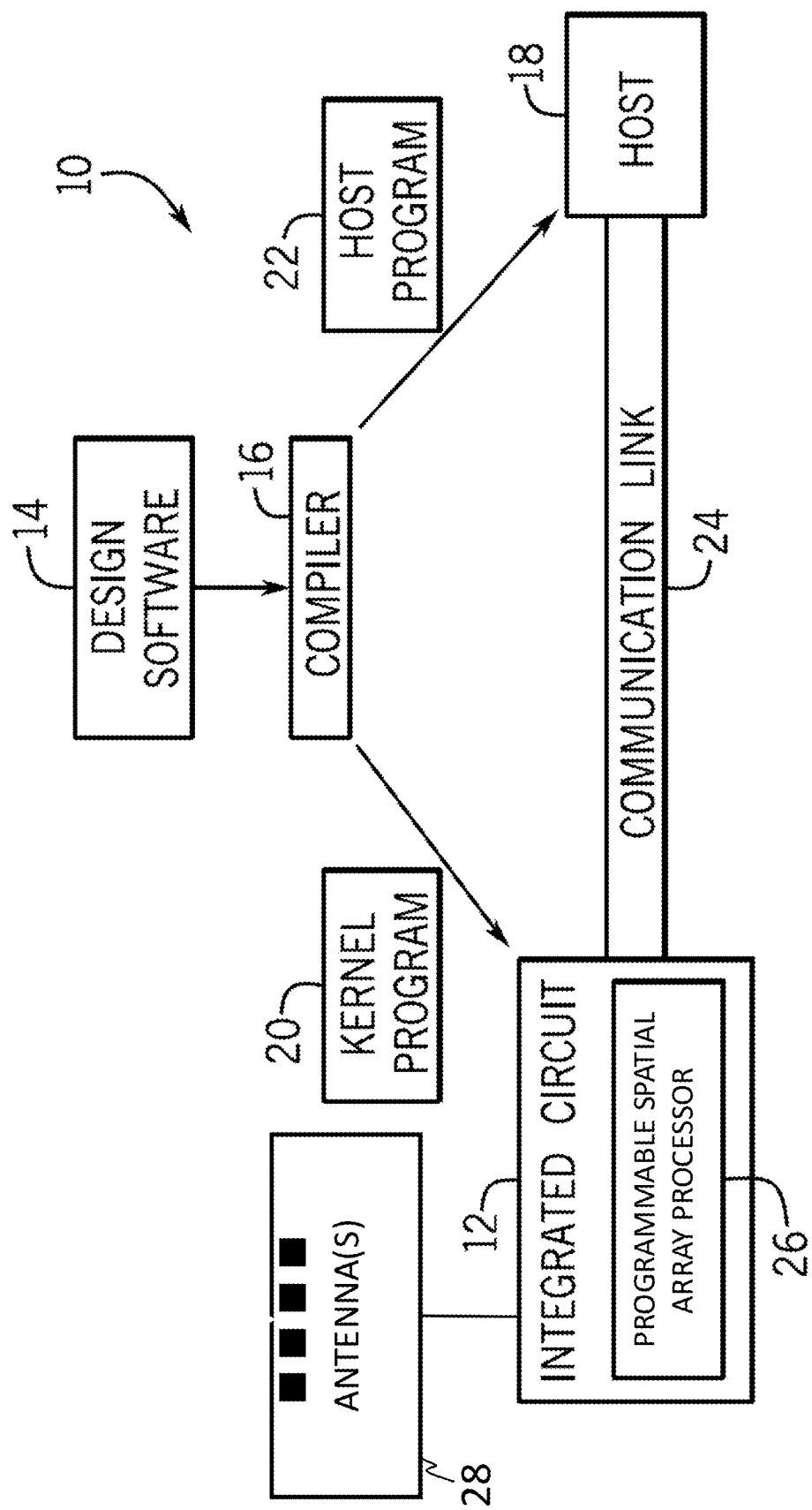
FIG. 1 is a block diagram of a system that includes an integrated circuit having a programmable spatial array processor, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "including" and "having" are intended to be inclusive and mean that there may be additional elements other than the listed elements. Additionally, it should be understood that references to "some embodiments," "embodiments," "one embodiment," or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B. Moreover, this disclosure describes various data structures, such as instructions for an instruction set architecture. These are described as having certain domains (e.g., fields) and corresponding numbers of bits. However, it should be understood that these domains and sizes in bits are meant as examples and are not intended to be exclusive. Indeed, the data structures (e.g., instructions) of this disclosure may take any suitable form.

An integrated circuit, such as an application specific integrated circuit (ASIC) or a programmable logic device (PLD) like a field programmable gate array (FPGA), may be part of an electronic device that perform wireless communications, machine learning, or many other tasks. These tasks may involve performing matrix decompositions. Indeed, matrix decomposition is widely used in wireless communication, machine learning, and other areas. For instance, multiple-input multiple-output (MIMO) wireless communication in 5G wireless systems, multivariate linear regressions in machine learning, systems of linear equations, matrix inversions and determinant calculations, and many others involve performing matrix decompositions. Different types of matrix decompositions include LU decomposition, QR decomposition, and Cholesky decomposition.

In contrast to single-purpose architectures that may support only one type of matrix decomposition, this disclosure provides a programmable spatial array processor that can be programmed to compute a variety of different types of matrix decompositions. The programmable spatial array processor has a two-dimensional upper triangular Processing Element (PE) array which acts as a high throughput engine. Every PE executes under instructions that provide programmability to support different modes.

As noted above, matrix decompositions are more complicated than matrix multiplication. The latter may generally use multiplication and addition operations and may have little or no data dependency among operations. Matrix decompositions, on the other hand, may have many data dependencies. This may cause one operation to have to wait for the result of another operation to be ready, which makes it difficult to handle data in parallel. Moreover, matrix decomposition usually has arithmetic operations other than multiplication, such as division and square root.

The programmable spatial array processor of this disclosure may use a control scheme that can mitigate the challenges of the data dependency of the various PEs in solving matrix decompositions. To solve this problem, an Instruction Share and Propagation (ISP) scheme may control all PEs efficiently. Instructions may be shared by certain PEs and propagated through them. This may substantially reduce the size or complexity of the instruction memory. Indeed, instructions may flow through the array in a systolic-like way, just like the data flow. All non-diagonal PEs may share the same instructions. This may (a) reduce instruction memory from $N^2/2$ to 2 and (b) allow instructions to transfer between adjacent PEs so that a long control path may be avoided. Furthermore, the programmability of the programmable spatial array processor may enable a fast switch between two different types of matrix operation. The array of the programmable spatial array processor may simply be fed with new instructions for new matrix operation. Additional reset or reconfiguration time may be avoided, enabling transitions to computing different types of matrix decomposition to occur rapidly and seamlessly.

In addition to matrix decompositions, the programmable spatial array processor may also support widely used matrix operations like back substitution, matrix-vector multiplication, matrix multiplying by its transpose ($A^T A$), and so on. The programmability even empowers it to perform customized functions. What is more, the programmable spatial array processor may have a triangular arrangement that, compared to a square array, may cut hardware resource usage nearly in half.

With this in mind, FIG. 1 illustrates a block diagram of a system 10 that may implement a programmable spatial array processor. A designer may desire to implement functionality, such as the programmable spatial array processor of this disclosure, on an integrated circuit device 12 (such as a field-programmable gate array (FPGA) or an application-specific integrated circuit (ASIC)). In some cases, the designer may specify a high-level program to be implemented, such as an OpenCL program, which may enable the designer to more efficiently and easily provide programming instructions to configure a set of programmable logic cells for the integrated circuit device 12 without specific knowledge of low-level hardware description languages (e.g., Verilog or VHDL). For example, because OpenCL is quite similar to other high-level programming languages, such as C++, designers of programmable logic familiar with such programming languages may have a reduced learning curve than designers that are required to learn unfamiliar low-level hardware description languages to implement new functionalities in the integrated circuit device 12.

Designers may implement their high-level designs using design software 14, such as a version of Intel® Quartus® Prime by INTEL CORPORATION. The design software 14 may use a compiler 16 to convert the high-level program into a lower-level description. The compiler 16 may provide machine-readable instructions representative of the high-level program to a host 18 and the integrated circuit device 12. The host 18 may include any suitable processing circuitry and may receive a host program 22 which may be implemented by the kernel programs 20. To implement the host program 22, the host 18 may communicate instructions from the host program 22 to the integrated circuit device 12 via a communications link 24, which may be, for example, direct memory access (DMA) communications or peripheral component interconnect express (PCIe) communications. While the techniques described above refer to the application of a high-level program, in some embodiments, a designer may use the design software 14 to generate and/or to specify a low-level program, such as the low-level hardware description languages described above. Further, in some embodiments, the system 10 may be implemented without a separate host program 22. Moreover, in some embodiments, the techniques described herein may be implemented in circuitry as hardened IP that is not programmed into a programmable logic device. Thus, embodiments described herein are intended to be illustrative and not limiting.

In some embodiments, the kernel programs 20 may enable configuration of a programmable spatial array processor 26 on the integrated circuit device 12. Indeed, the programmable spatial array processor 26 may represent a circuit design of the kernel program 20 that is configured onto the integrated circuit device 12 (e.g., formed in soft logic). In some embodiments, the programmable spatial array processor 26 may be partially or fully formed in hardened circuitry (e.g., application-specific circuitry of the integrated circuit 12 that is not configurable as programmable logic). The host 18 may use the communication link 24 to cause the programmable spatial array processor 26 to decompose matrices according to any suitable matrix decomposition type. For example, the programmable spatial array processor 26 may be used to perform matrix decomposition to detect or transmit a signal for multiple-input multiple-output (MIMO) communication via antennas 28.

Figure 2:
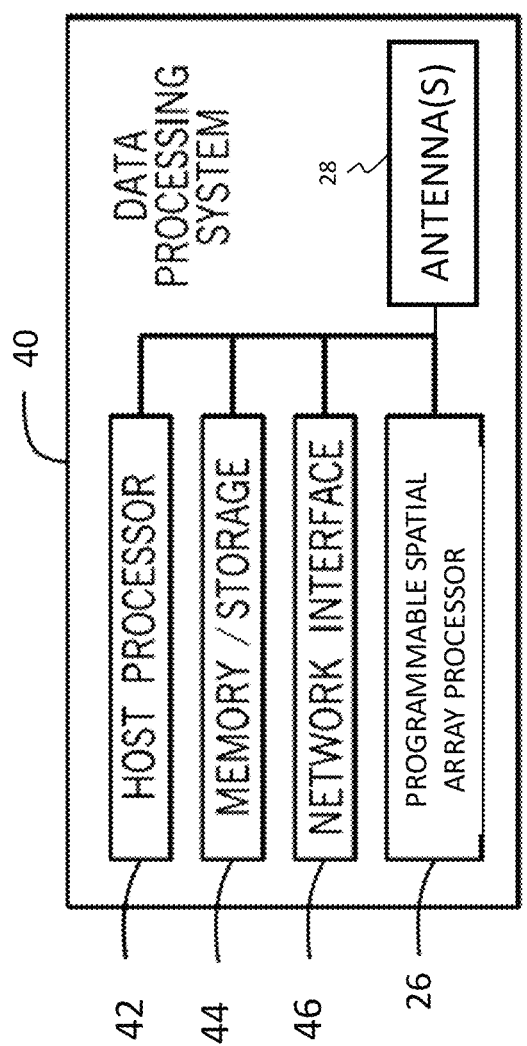
FIG. 2 is a block diagram of another system that includes an integrated circuit having a programmable spatial array processor, in accordance with an embodiment.

The programmable spatial array processor 26 may be component included in a data processing system 40, as shown in FIG. 2. The data processing system 40 may include a host processor 42 (e.g., a central-processing unit (CPU)), memory and/or storage circuitry 44, and a network interface 46. The data processing system 40 may include more or fewer components (e.g., electronic display, user interface structures, application specific integrated circuits (ASICs)). The host processor 42 may include any suitable processor, such as an INTEL® Xeon® processor or a reduced-instruction processor (e.g., a reduced instruction set computer (RISC), an Advanced RISC Machine (ARM) processor) that may manage a data processing request for the data processing system 40 (e.g., to perform encryption, decryption, machine learning, video processing, voice recognition, image recognition, data compression, database search ranking, bioinformatics, network security pattern identification, spatial navigation, sensing or transmitting using a phased array, communicating via a MIMO wireless system, or the like). The memory and/or storage circuitry 44 may include random access memory (RAM), read-only memory (ROM), one or more hard drives, flash memory, or the like. The memory and/or storage circuitry 44 may hold data to be processed by the data processing system 40. In some cases, the memory and/or storage circuitry 44 may also store configuration programs (bitstreams) for programming a programmable logic device that may hold the programmable spatial array processor 26. The memory and/or storage circuitry 44 may, additionally or alternatively, store instructions to program the programmable spatial array processor 26. The network interface 46 may allow the data processing system 40 to communicate with other electronic devices. The data processing system 40 may include several different packages or may be contained within a single package on a single package substrate. In some cases, the antennas 28 may be a component of the network interface 46 or may be used by the network interface 46 to receive or transmit signals in particular spatial directions.

In one example, the data processing system 40 may be part of a data center that processes a variety of different requests. For instance, the data processing system 40 may receive a data processing request via the network interface 46 to perform encryption, decryption, machine learning, video processing, voice recognition, image recognition, data compression, database search ranking, bioinformatics, network security pattern identification, spatial navigation, digital signal processing, or some other specialized task. Some or all of the components of the data processing system 40 may be virtual machine components running on physical circuitry (e.g., managed by one or more hypervisors or virtual machine managers). Whether physical components or virtual machine components, the various components of the data processing system 40 may be located in the same location or different locations (e.g., on different boards, in different rooms, at different geographic locations). Indeed, the data processing system 40 may be accessible via a computing service provider (CSP) that may provide an interface to customers to use the data processing system 40 (e.g., to run programs and/or perform acceleration tasks) in a cloud computing environment.

High-Level Architecture of Programmable Spatial Array Processor

Figure 3:
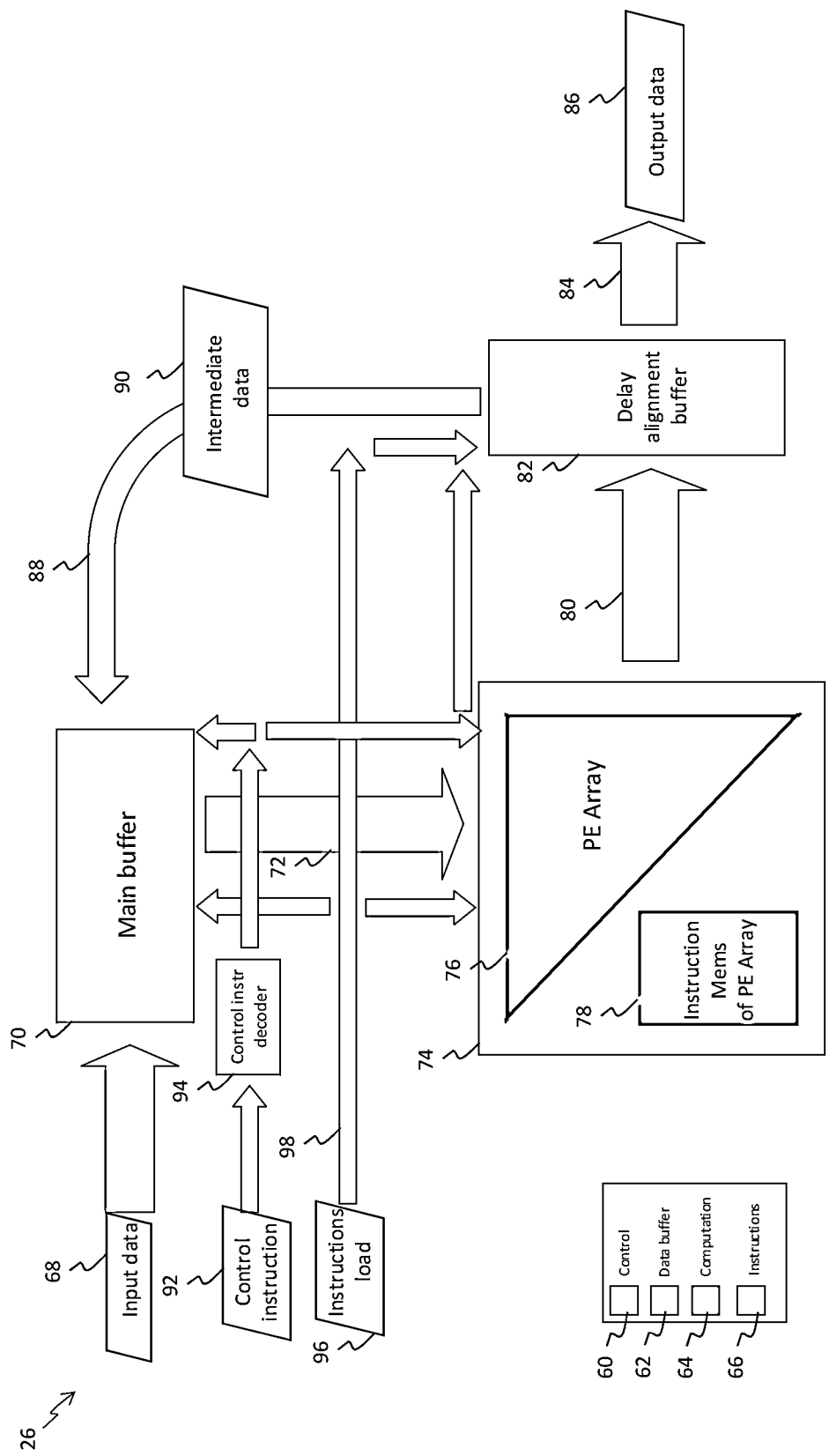
FIG. 3 is a high-level block diagram of the programmable spatial array processor, in accordance with an embodiment.

FIG. 3 shows a top block diagram of the programmable spatial array processor 26. Control flow is shown in first hatching 60, data flow is shown in second hatching 62, computation is shown in third hatching 64, and instruction flow is shown in fourth hatching 66. Input data 68 streams into a main buffer 70 first, then may flow 72 to a spatial array 74 that includes a processing element (PE) array 76 and instruction memory 78 that hold instructions to control processing elements of the PE array 76. The instruction memory 78 may represent separate memories for each different type of processing element of the PE array 76. When the PE array 76 is available, the input data 68 is enters the PE array 76. After calculation in the PE array 76, results 80 stream into a delay alignment buffer 82 for data rearrangement. The output of delay alignment buffer goes to an output port 84 as output data 86 or loops back via a feedback path 88 to the main buffer 70 as intermediate data 90. The second hatching 62 shows the control signal flow. Control instructions 92 may enter a control instruction decoder 94 to be distributed to the main buffer 70, the spatial array 74, and the delay alignment buffer 82. The third hatching 64 shows an instruction preload flow. Instruction load commands 96 may take an instruction preload path 96 to the main buffer 70, the spatial array 74, and the delay alignment buffer 82.

The input data 68 may take any suitable form, including a matrix or vector format with throughput of one matrix row (column) per clock cycle. A block of the input data 68 may contain a batch of matrices to utilize the pipeline capability of PE array 76 and improve average throughput. Any suitable quantity of matrices or vectors may be used in a batch (e.g., 2, 3, 4, 5, 6, 7, 8, 16, 32, 64, 100, 128, 200, 256, 500, 512, 1000, 1024, or more or fewer). For instance, 32 consecutive matrices may form a batch, in this case the batch size is 32.

Figure 4:
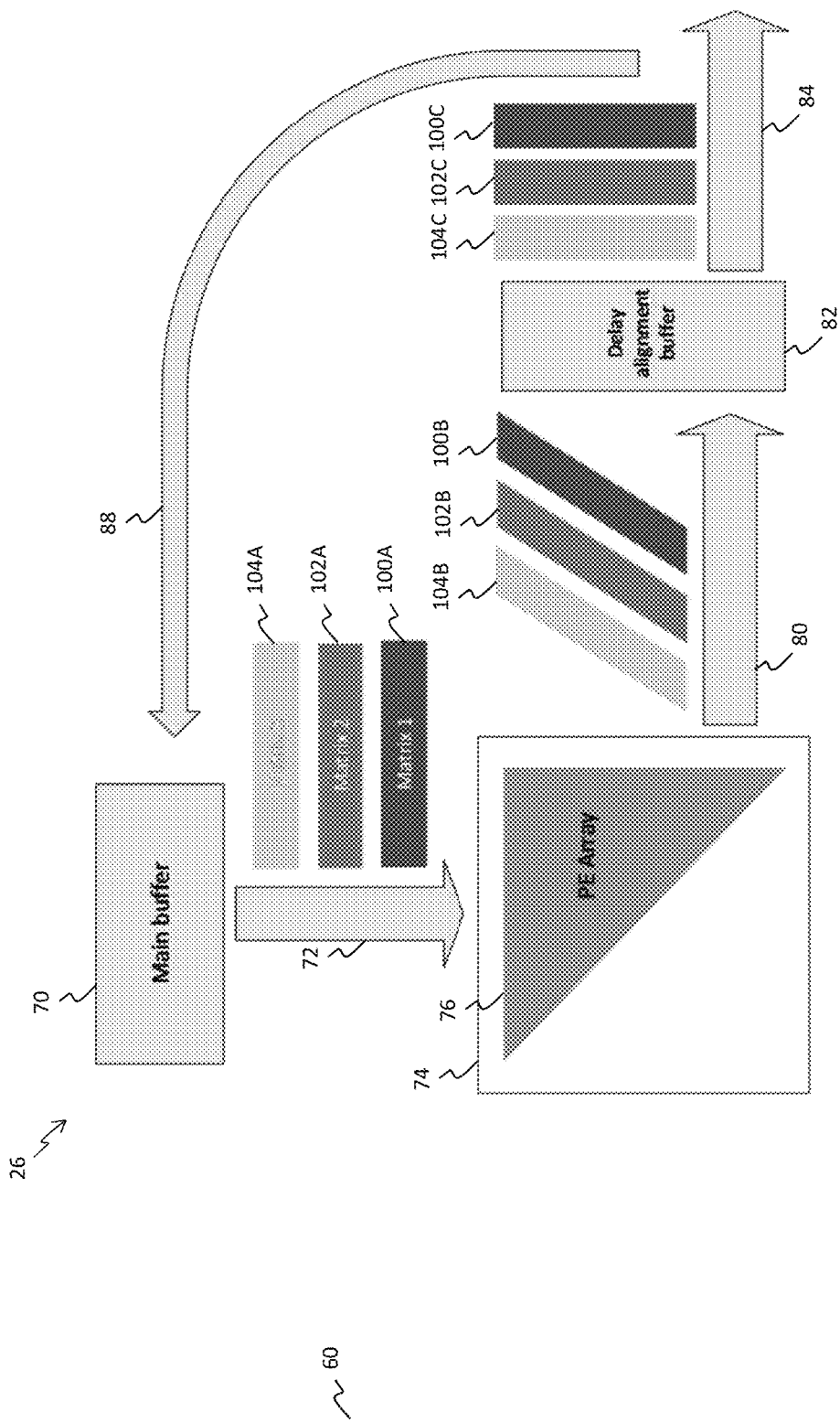
FIG. 4 is a block diagram illustrating a manner in which a batch of matrices may be pipelined through the programmable spatial array processor, in accordance with an embodiment.

For example, as shown in FIG. 4, a batch of three input matrices 100A, 102A, 104A may be input to the PE array 76 through the main buffer 70. The PE array 76 may compute result matrices 100B, 102B, and 104B in a pipelined manner. As a consequence, the result matrices 100B, 102B, and 104B may overlap one another in time. In the example shown in FIG. 4, later parts of the result matrix 100B computed from the input matrix 100A overlap with earlier parts of the result matrix 102B computed from the input matrix 102A. Likewise, later parts of the result matrix 102B overlap with earlier parts of the result matrix 104B computed from the input matrix 104A. The delay alignment buffer 82 removes these latencies to produce aligned output matrices 100C, 102C, and 104C.

Processing Element (PE) Array

Figure 5:
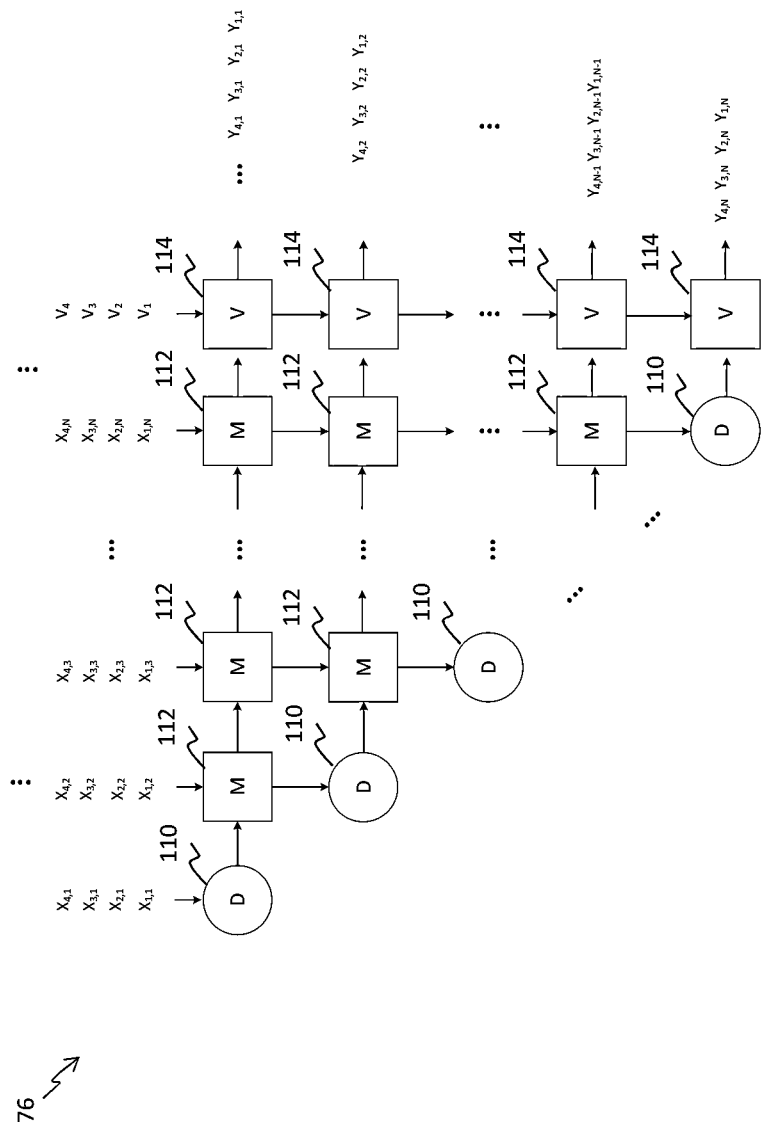
FIG. 5 is a block diagram of a processing element array of the programmable spatial array processor, in accordance with an embodiment.

The core part of the programmable spatial array processor 26 is the two-dimensional processing element (PE) array 76. As shown in FIG. 5, the PE array 76 has an upper triangle form to achieve high utilization efficiency, since most matrix decompositions lead to triangular result matrices. The PE array 76 includes at least three types of processing elements: diagonal (D) processing elements (PEs) 110, multiply-accumulate (M) processing elements (PEs) 112, and vector (V) processing elements (PEs) 114. The overall dataflow direction is rightward and downward. Input matrices (X) and vectors (V) stream into the PE array 76 from the upper side. The PE array 76 outputs the results (Y) to the right side. The PEs 110, 112, and 114 accept data from an upper side or left side, perform some operations and output the results to a bottom or right side.

The M PEs 112 mainly perform multiplication and accumulation (MAC) operations, and the M PEs 112 form the upper triangular part of a square N-by-N array, of which any suitable number N may define the array. The M PEs 112 may be considered an internal processing element type of the processing element array 76, since they are bounded to the left and right by the D PEs 110 and the V PEs 114. Multiplication and accumulation (MAC) operations are abundant in matrix operations. The V PEs 114 located at the rightmost column handle vector-related operations like matrix-vector multiplication. The V PEs 114 may have the same or a similar internal hardware structure as the M PEs 112. The main difference between the V PEs 114 and the M PEs 112 is that they run under different instructions (with different behaviors). The D PEs 110 may include more compute resources than the M PEs 112, since the diagonal elements may perform more complicated computations than non-diagonal elements in most matrix decomposition cases. As discussed further below, the D PEs 110 may include some MAC units and other math function (such as inverse square root) units, or may include units that perform certain specific operations.

The PE array 76 structure may achieve a relatively high operating clock frequency, since each PE 110, 112, or 114 may only connect with adjacent PEs 110, 112, or 114. This means that there may be no long routing path or that the routing paths between PEs 110, 112, and 114 may be sufficiently similar so as to have similar (e.g., equal) latencies. And this structure may relatively easily scale up to a large array size.

Figure 6:
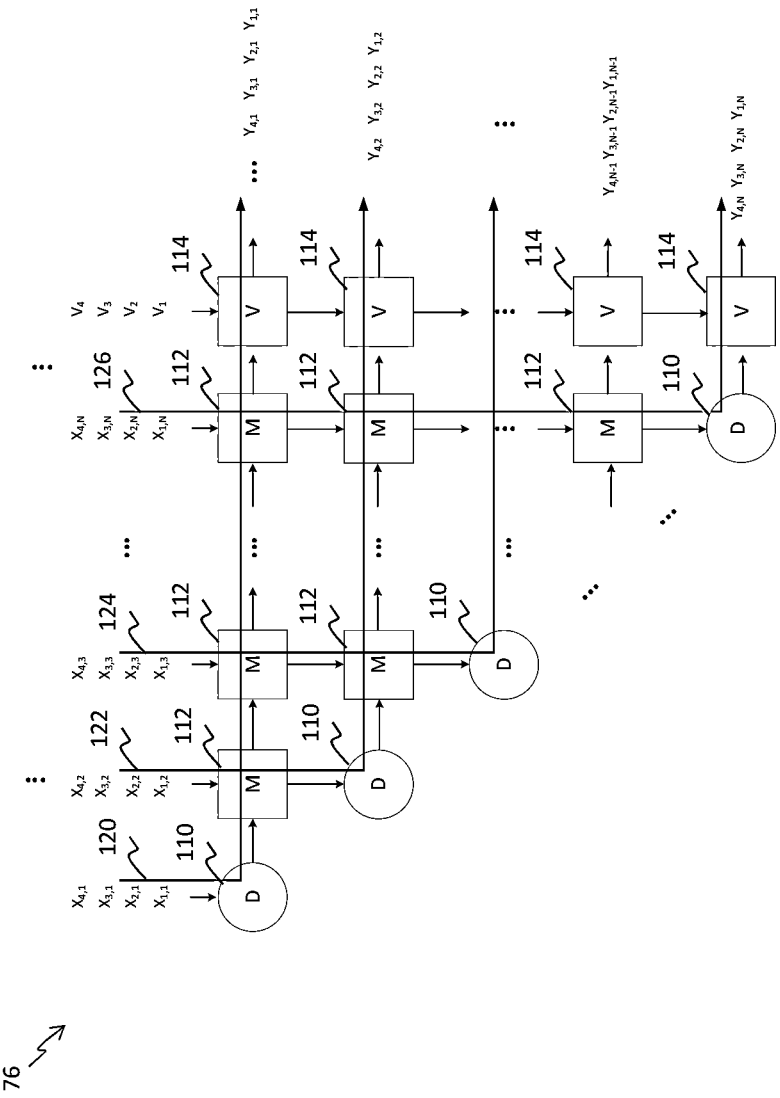
FIG. 6 is a diagram of data flow through the processing element array, data processing system that uses the integrated circuit to perform a variety of matrix decompositions, in accordance with an embodiment.

FIG. 6 illustrates a data flow through the PE array 76. FIG. 6 provides an example of an $X^TX$ (X transpose multiply X) calculation. Every column 120, 122, 124, . . . , 126 of input matrix X goes downward through each M PE 112 of that column and turns right when it meets the D PE 110. The respective M PEs 112 calculate the inner product of its upper input and left input. In addition to the original data propagation path, there is a result data (inner product in this case) propagation path going through the rows of the PEs 110, 112, and 114. Final results output to the right side as Y matrix.

Example architectures of the PEs 110, 112, and 114 will be described below. It should be appreciated that these are intended to be illustrative and not exhaustive. Indeed, the PEs 110, 112, and 114 may take any suitable form and have any suitable architectures.

Figure 7:
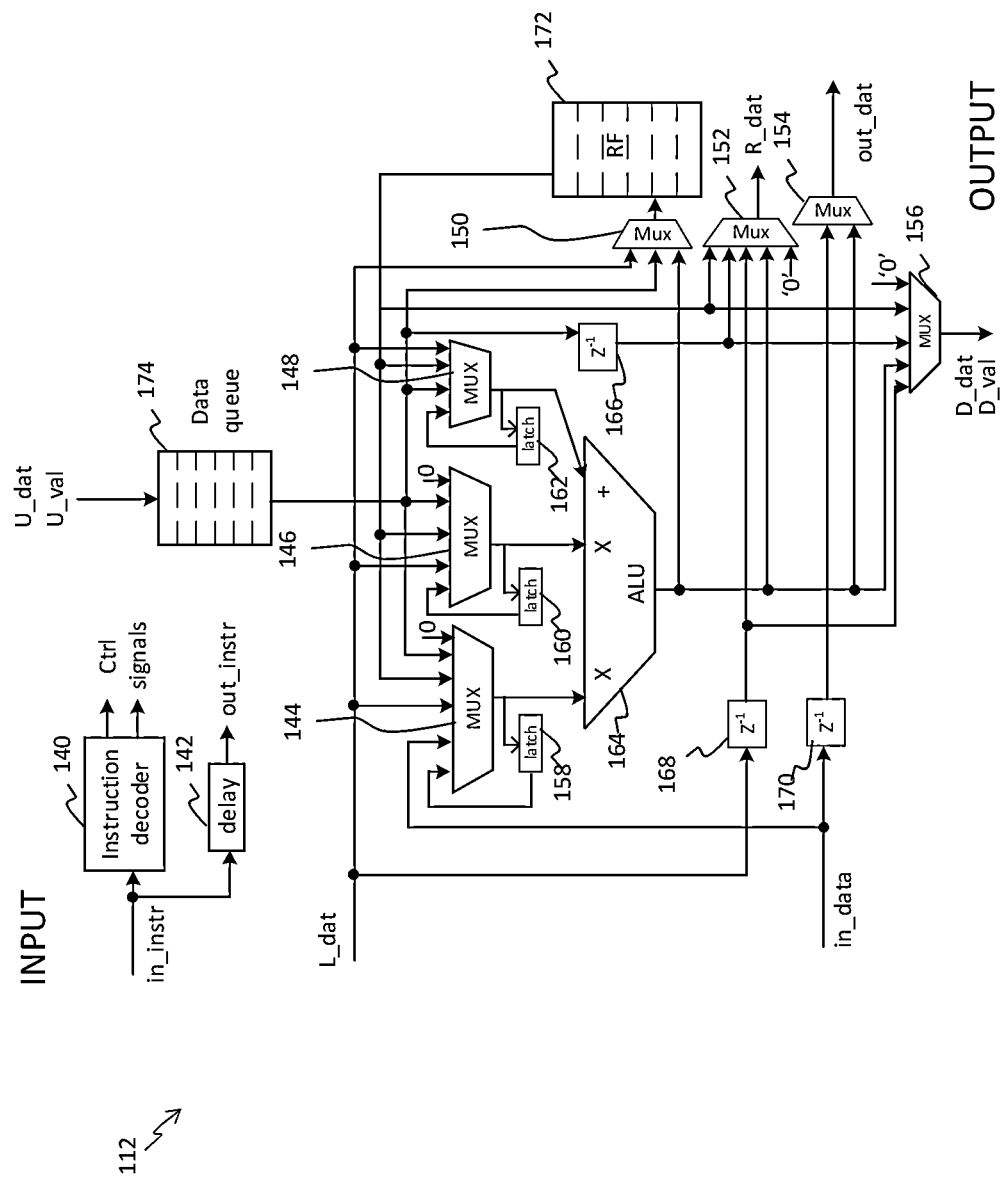
FIG. 7 is a block diagram of an example architecture of a multiply-accumulate (M) processing element (PE) of the processing element array, in accordance with an embodiment.

Multiply-accumulate (M) PE 112 Architecture. One example architecture of an M PE 112 appears in FIG. 7. The M PE 112 includes several main components:

- An instruction decoder 140, which receives input instructions in_instr and translates them into control (Ctrl) signals to control the computational flow of the M PE 112. A delay block 142 may hold the instructions while computations are performed before propagating the instructions to a neighboring M PE 112. Note that the instruction flow for the various PEs 110, 112, and 114 will be discussed further below.
- Routing circuits for interface and internal signals, which may include multiplexers (MUXes) 144, 146, 148, 150, 152, 154, and 156 and latches 158, 160, and 162.
- An arithmetic Logic Unit (ALU) 164, which may perform arithmetic operations. For certain applications, such as for a multiple-input multiple-output (MIMO) receiver, the ALU 164 may be a complex number ALU (e.g., CMAC or CALU). Data inverters 166, 168, and 170 may be used to invert various input data before processing in the ALU 164 or instead of processing in the ALU 164. Some data may be passed without any processing.
- A register file (RF) 172, which may include any suitable number of registers to store data.
- A data queue 174, which may buffer data from an upper side input.

Figure 8:
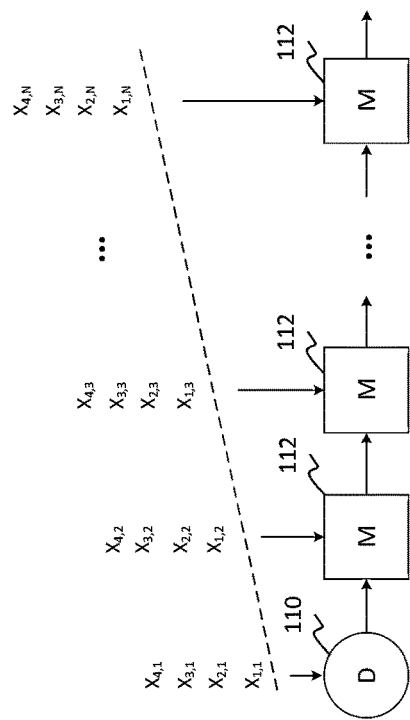
FIG. 8 is a data flow diagram of one manner of feeding data into the processing element array if the processing elements lacked a data queue.

The ALU 164 may perform arithmetic operations such as add, multiply, multiply-add, multiply-accumulate, and so on. It may be implemented in complex form (named CMAC or CALU) to support complex number arithmetic that is widely used in wireless communication systems. The inputs of the ALU 164 can have multiple sources, such as input ports, the register file (RF) 172, or the data queue 174. The input and output interfaces shown in FIG. 7 may include:

Input:
- in_instr: input instruction
- L_at: left data in (path of original data)
- in_data: input data (path of result data)
- U_dat: data from upper side
- U_val: validation of U_dat Output:
- out_instr: output instruction (propagates in_instr to next PE)
- R_dat: right data out (path of original data)
- out_dat: output data (path of result data)
- D_dat: data to downwards
- D_val: validation of D_dat The data queue 174 is used to buffer upper input data, since the left input data may be delayed after upper input data. One way to handle this delay gap is to input the input data in a staggered way, as shown in FIG. 8. Each input sequence is delayed to meet the systolic propagation pattern. Using the data queue 174, however, the M PE 112 may save the effort of rearranging input data, and provide flexibility to handle many different delay offset patterns of different algorithms.

Figure 9:
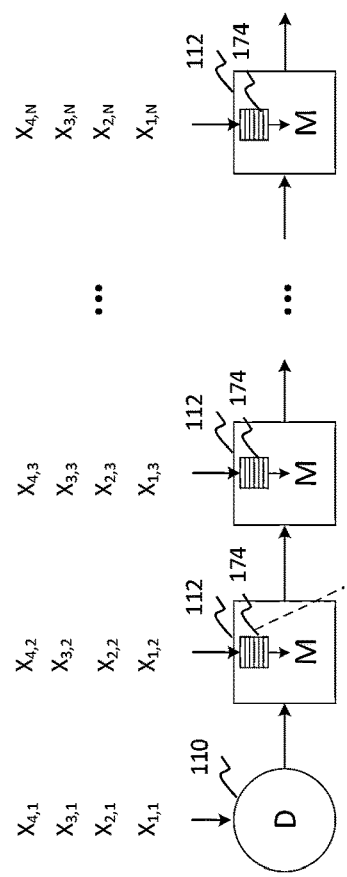
FIG. 9 is a data flow diagram of one manner of feeding data into the processing element array using data queues in respective processing elements, in accordance with an embodiment.

It can be observed that the data queue method shown in FIG. 9 may involve more buffering resources compared to the staggered input scheme of FIG. 8. But the data queue method of FIG. 9 may reduce consumption of buffering resources in the main buffer 70 of the programmable spatial array processor 26 (FIG. 3).

Figure 10:
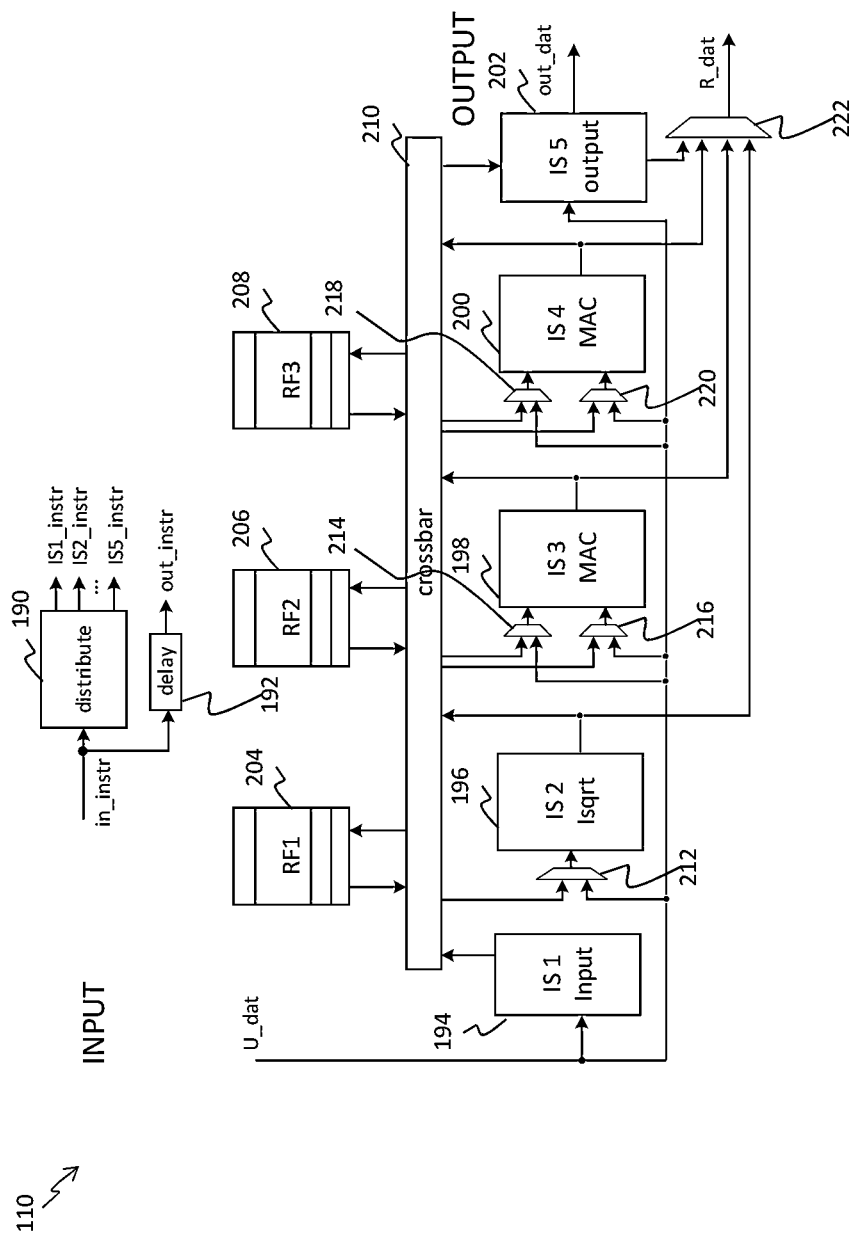
FIG. 10 is a block diagram of an example architecture of a diagonal (D) processing element (PE) of the processing element array, in accordance with an embodiment.

Diagonal (D) PE 110 Architecture. Since the D PEs 110 may handle more complicated calculations than an M PE 112, the D PEs 110 may have more functional units. In an example, shown in FIG. 10, the D PE 110 may receive input instructions (in_instr) that are translated and distributed by an instruction decoder 190. A delay block 192 may hold the instructions while computations are performed before propagating the instructions to a neighboring D PE 110. Note that the instruction flow for the various PEs 110, 112, and 114 will be discussed further below. Among other things, the instructions may represent control signals for an issue slot architecture In the example architecture of the D PE 110 shown in FIG. 10, there are five issue slots 194, 196, 198, 200, and 202 and three register files 204, 206, and 208 connected by a crossbar 210. Routing circuitry may include several multiplexers (MUXes) 212, 214, 216, 218, 220, and 222 to selectively route data through the D PE 110 according to the received instructions. Each issue slot 194, 196, 198, 200, and 202 performs one kind of operation. Any suitable number of issue slots and register files may be used, and it should be understood that the number and types shown in FIG. 10 are provided by way of example for illustrative purposes. Each issue slot 194, 196, 198, 200, and 202 can receive data from an input port (U_dat) and send data to an output port (R_dat). The input slots may operate as follows:

Input slot 194: store the input data into RFs.
Isqrt slot 196: inverse square root $$\left(\frac{1}{\sqrt{x}}\right).$$

Other operations like square root and division can be calculated using Isqrt result $$\left(\sqrt{x} = x * \frac{1}{\sqrt{x}}, \frac{1}{x} = \frac{1}{\sqrt{x}} * \frac{1}{\sqrt{x}}\right).$$

MAC slot 198, 200: multiplier-accumulator.
Output slot 202: generates output data from RFs or other issue slots.

Figures 11, 12:
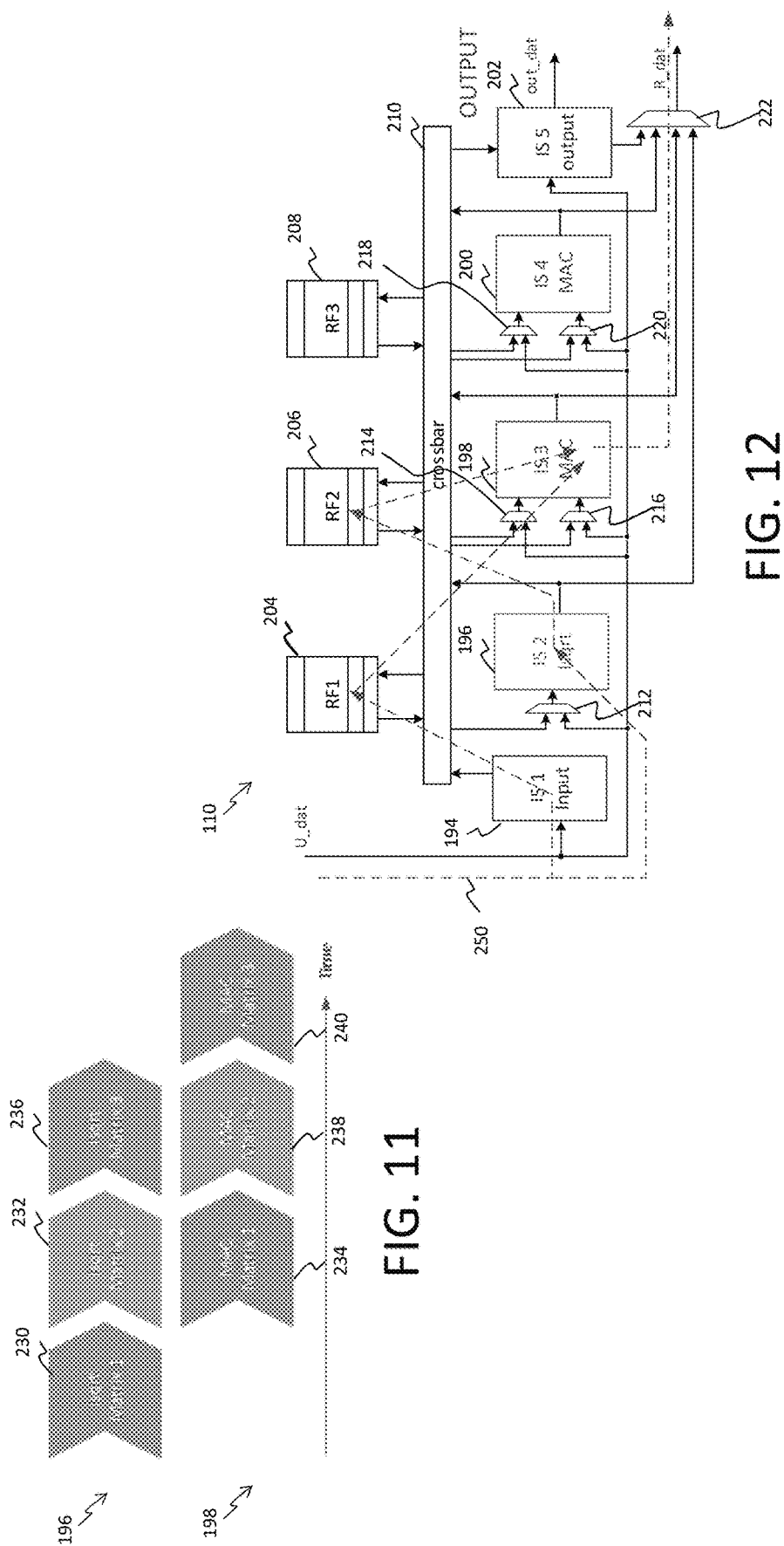
FIG. 11 is a flow diagram illustrating a method of pipelining operations, even on different matrices, using the diagonal (D) processing element (PE), in accordance with an embodiment.
FIG. 12 is a block diagram illustrating a data flow through the example architecture of the diagonal (D) processing element (PE) of the processing element array, in accordance with an embodiment.

Multiple issues in a D PE 110 can work in a pipelined manner to achieve high throughput. Take Cholesky decomposition, for example. The process includes inverse square root (Isqrt) from the Isqrt slot 196 and multiplications in the issue slot 198, which use the result from the Isqrt slot 196. Using this pipeline scheme, the two issue slots 196 and 198 can work in parallel. An example is shown in FIG. 11. Here, the issue slot 196 may perform a first square root operation 230 on a first matrix (Matrix 1) at a first time. At a second time, the issue slot 196 may perform a second square root operation 232 on a second matrix (Matrix 2) in parallel while the issue slot 198 performs a first multiply-accumulate operation 234 on the first matrix (Matrix 1) using the results of the operation 230. At a third time, the issue slot 196 may perform a third square root operation 236 on a third matrix (Matrix 3) in parallel while the issue slot 198 performs a second multiply-accumulate operation 238 on the second matrix (Matrix 2) using the results of the operation 232. At a fourth time, the issue slot 198 may perform a third multiply-accumulate operation 240 on the third matrix (Matrix 3) using the results of operation 236. The corresponding dataflow is shown in FIG. 12, which is indicated by dashed lines: first, the input data goes through the issue slot 1 (IS1) 194 into RF1 204 and issue slot 2 (IS2) 196, then IS2 196 performs inverse square root and write result into RF2 206, and then issue slot 3 (IS3) 198 reads data from RF1 204 and RF2 206 to perform multiplication and outputs the results as R_dat.

Instruction Share and Propagation

As previously discussed with respect to FIG. 3, all PEs in the PE array 76 are controlled by instructions that may be stored in the instruction memory 78, which may represent separate memories for the different varieties of processing elements (PE) 110, 112, and 114. To support a variety of matrix decomposition functions and provide flexibility for customized design, merely several control bits are not enough. A well-designed instruction set can support more general arithmetic operations. An example of a suitable Instruction Set Architecture (ISA) will be discussed in the Instruction Set Architecture (ISA) section discussed further below. This section mainly focuses on how to efficiently distribute instructions to all PEs 110, 112, and 114 in the PE array 76. One straightforward way would be to use a central control unit to generate all the instructions and distribute them to all PEs. This could cause an extremely high fan-out from such a control unit, however, which could heavily deteriorate the performance of the circuit. In addition to this high fan-out problem, such a central control unit would be complicated and could involve much higher development resources and much more hardware logic than the system discussed below. Another way to distribute instructions to all PEs 110, 112, and 114 in the PE array 76 may involve using an instruction memory in each PE. In such a case, each PE 110, 112, or 114 may maintain a Program Counter (PC) to read a particular instruction from its instruction memory. This, however, may involve a tremendous amount of memory. Moreover, the design of the PCs would involve taking great care to ensure the synergy of all of the PCs. The content reload for all instruction memories could also cause either high fan-out (e.g., with parallel reload) challenges or long latency (e.g., with serial reload).

Figure 13:
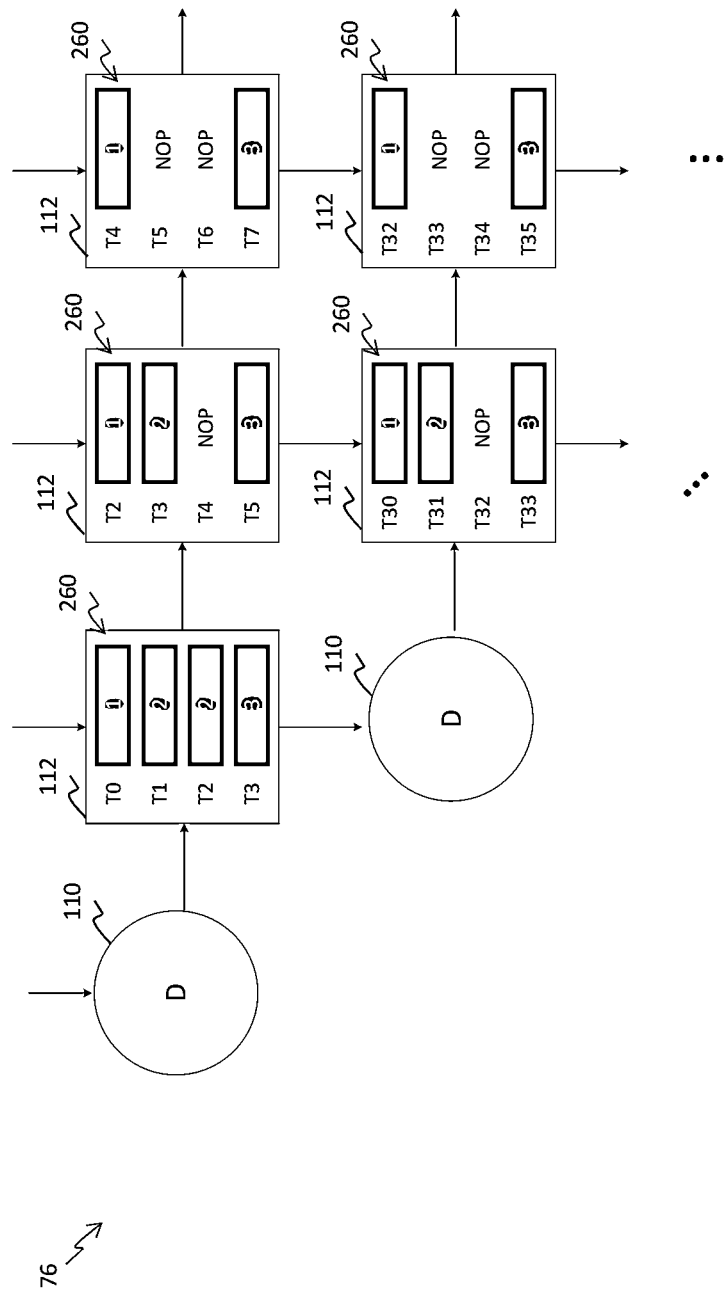
FIG. 13 is a block diagram showing a propagation of instructions through different processing elements of the processing element array, in accordance with an embodiment.

Accordingly, a scheme referred to as Instruction Share and Propagation (ISP) may overcome some of the challenges mentioned above (e.g., avoiding such high fan-out and high memory utilization problems). The design of Instruction Share and Propagation (ISP) is made possible because the M PEs 112 and the D PEs 110 generally respectively execute the same or similar programs with only time offset and slight code differences. For instance, in a Cholesky decomposition procedure, every M PE 112 may execute the same first instruction but at different start times, and almost the same remaining instructions except that some of them may be ignored, as shown in FIG. 13. Here, there are three different instructions depicted by rectangles numbered 1, 2 and 3, and a "T+number" at its left to indicate the time this instruction to be executed. These are schematically shown as instructions 260 amid the M PEs 112. The term "NOP" means no operation is needed. It can be found that one more instruction (instruction 2) is ignored (NOP) for every one step right in a row, and every M PE 112 in one column has the same instructions. These regularities enable the use of Instruction Share and Propagation (ISP).

Figure 14:
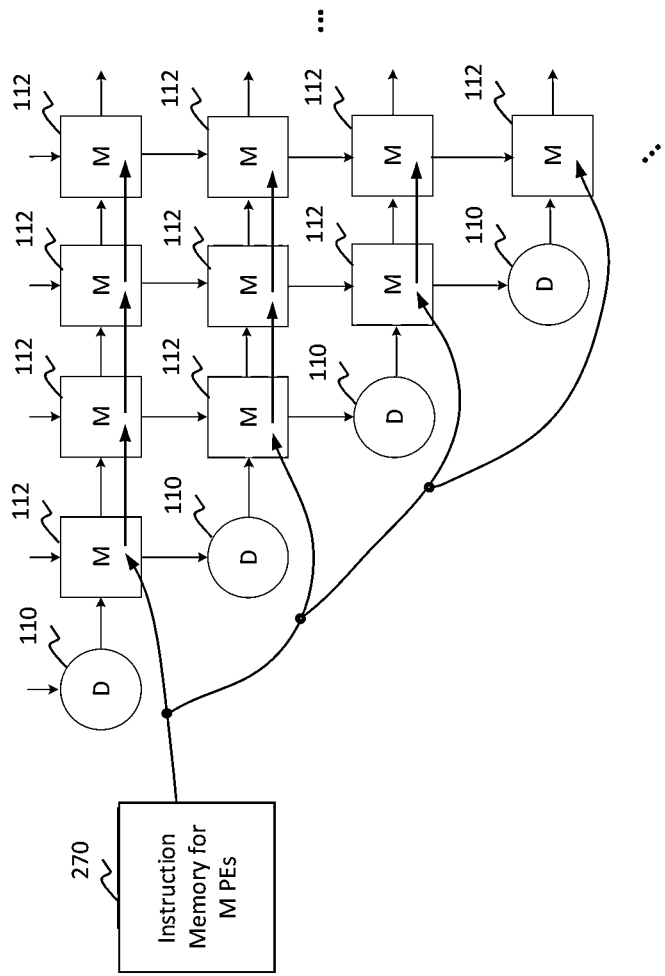
FIG. 14 is a block diagram showing a propagation of instructions through multiply-accumulate (M) processing elements (PEs) of the processing element array, in accordance with an embodiment.

As shown in FIG. 14, the similarity of instruction executions among M PEs 112 may allow Instruction Share and Propagation (ISP) to use as few as one instruction memory 270 that contains the programs that all M PEs 112 share. Instruction Share and Propagation (ISP) propagates each instruction to all M PEs 112. One instruction is read from instruction memory 270 and sent to all rows of the PE array 76, which propagates to all M PEs 112.

Figure 15:
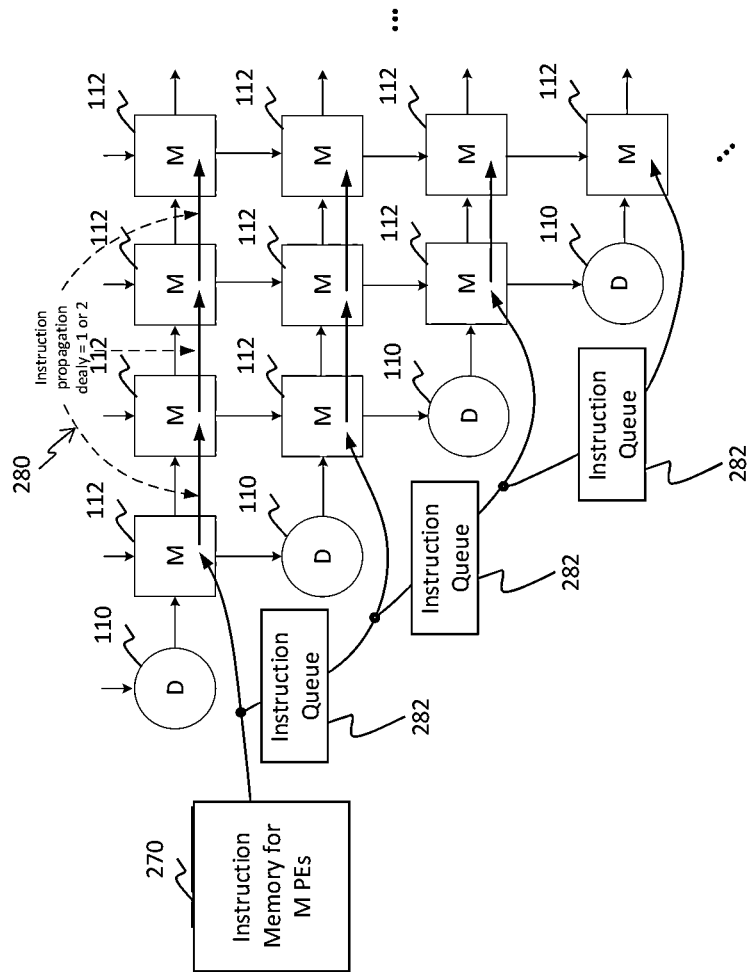
FIG. 15 is a block diagram illustrating delays for propagation of instructions through the multiply-accumulate (M) processing elements (PEs) of the processing element array, in accordance with an embodiment.

As can be seen, the start time of instruction execution of each M PE 112 is different. As such, the delay of instruction arrival to each M PE 112 will be different and varies among functions. For example, the instruction delay between two adjacent M PEs 112 in one row may be 1 or 2 cycles (or more, as desired). The instruction delay between two adjacent rows of M PEs 112 could be many more cycles. As shown in FIG. 15, instruction queues 282 for the rows of M PEs 112 may implement the delay offset (e.g., some number of cycles) between array rows of M PEs 112, and right side propagation delay can be set to 1 or 2 cycles.

Figure 16:
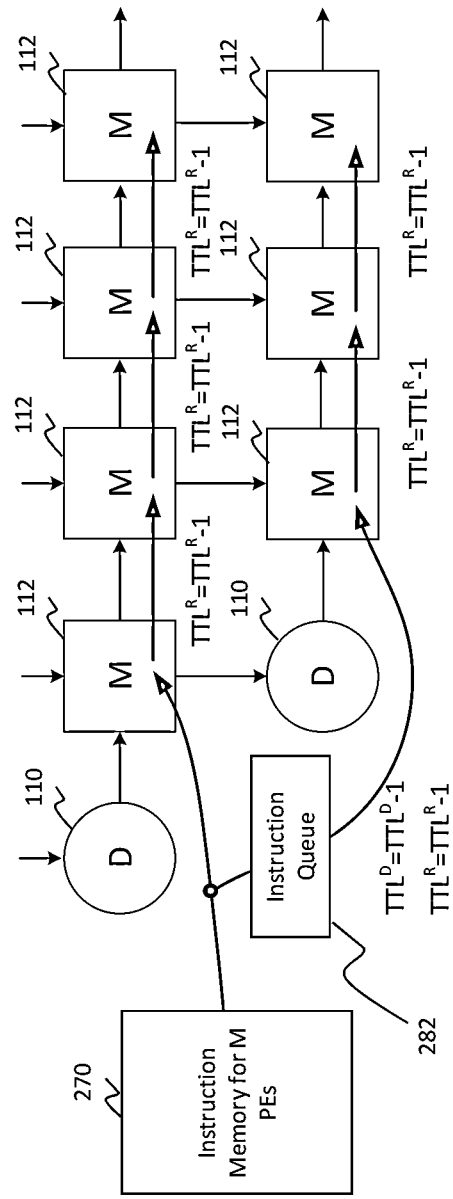
FIG. 16 is a block diagram illustrating the use of time-to-live (TTL) on instructions propagated through the multiply-accumulate (M) processing elements (PEs) of the processing element array, in accordance with an embodiment.

There may also be a Time to Live (TTL) domain in each instruction indicating whether this instruction should be executed, as shown in FIG. 16. The value of TTL may be reduced by 1 through each hop. When it turns to less or equal to 0, the instruction is thereafter ignored (e.g., becomes NOP). Specifically, the TTL domain is divided into 2 parts: TTL_R (horizontal) and TTL_D (vertical).

Figure 17:
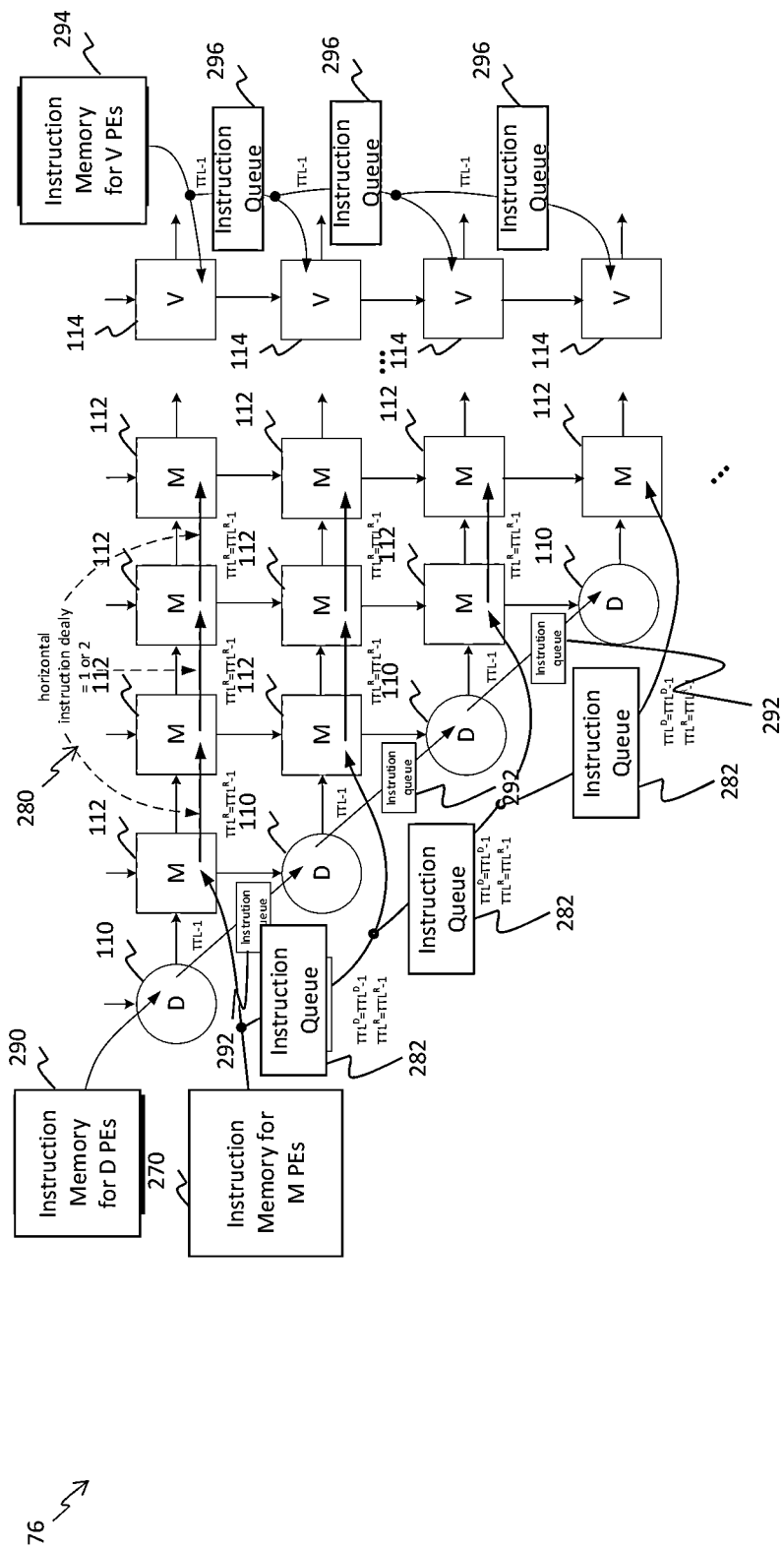
FIG. 17 is a block diagram illustrating a propagation of instructions through diagonal (D) processing elements (PEs) and vector (V) processing elements (PEs) of the processing element array, in accordance with an embodiment.

FIG. 17 illustrates Instruction Share and Propagation (ISP) for all of the PEs of the PE array 76. In addition to the instruction memory 270, there is also an instruction memory 290 for D PEs 110 with corresponding instruction queues 292, as well as an instruction memory 294 for V PEs 110 with corresponding instructions queues 296. Each instruction is read from its respective instruction memory 290, 270, and 294 and propagated to all related PEs 110, 112, and 114. The instruction queues 282, 292, and 296 insert a desired delay between two adjacent rows, or called vertical delay. The delay between two adjacent M PEs 112 in a row, which is called horizontal delay, should be set to 1 or 2.

Figure 18:
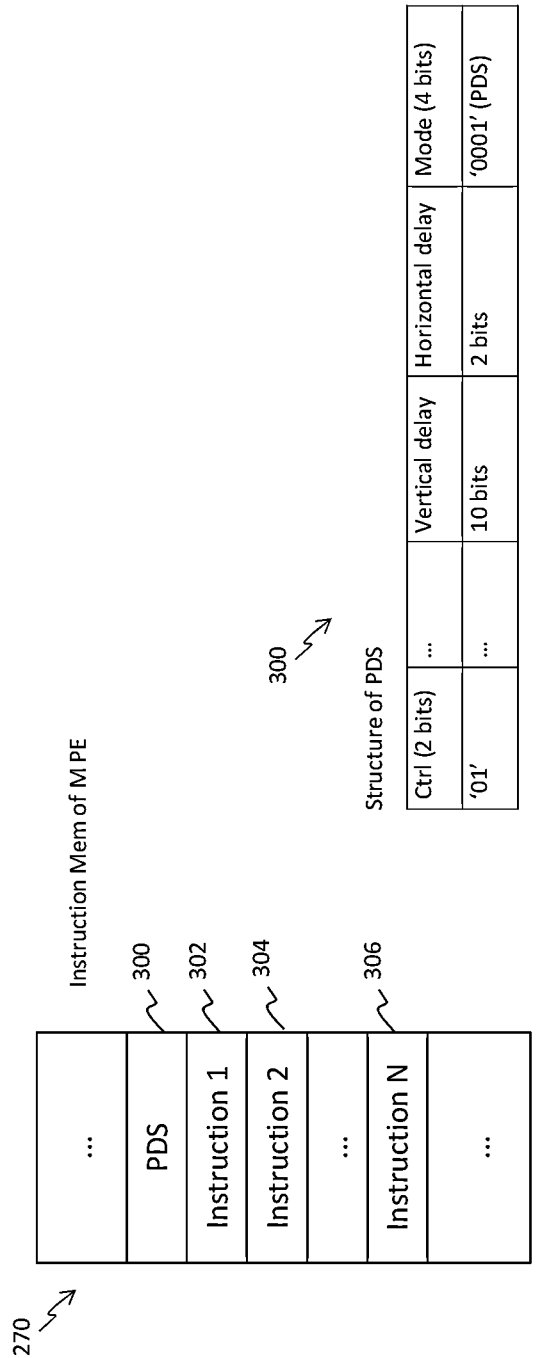
FIG. 18 is a block diagram illustrating a set of instructions that may be stored in a common instruction memory for all or several multiply-accumulate (M) processing elements (PEs) of the processing element array, in accordance with an embodiment.

FIG. 18 illustrates example instructions stored in the instruction memory 270 for the M PEs 112. A special instruction may be used to set vertical delay and horizontal delay, which may be referred to as a Propagation Delay Setting (PDS) instruction 300. The PDS instruction 300 may be located in a particular place (e.g., the first place) in a program containing any suitable number N other instructions 302, 304, . . . , 306. The PDS instruction 300 propagates to all M PEs 112 like other instructions and may set the value of delay for M PE 112. In the example of FIG. 18, the PDS instruction 300 includes control (Ctrl) bits, some bits that indicate vertical delay (e.g., 1, 2, 3, 4, 5, 6, 7, 8, 9, 10, 11, 12, 13, 14, 15, 16, 17, 18, 19, 20, or more bits), some bits that indicate horizontal delay (e.g., 1, 2, 3, 4, 5, 6, 7, 8, 9, 10 bits) that may be fewer than the number of bits that indicate vertical delay, and some bits that indicate the mode of the instruction (here, PDS).

Figure 19:
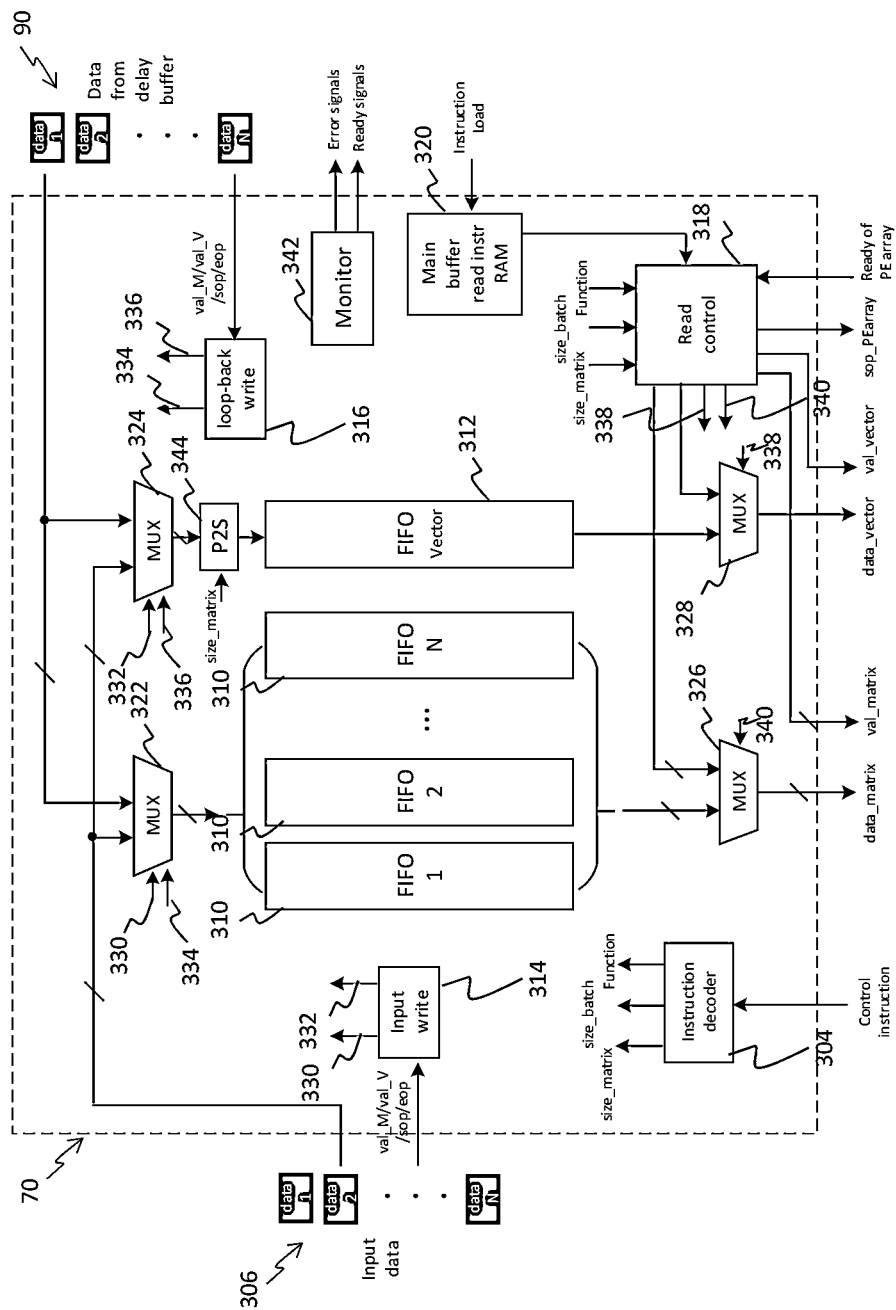
FIG. 19 is a block diagram of a main buffer that feeds the processing element array, in accordance with an embodiment.

FIG. 19 shows a block diagram of the main buffer 70. The main buffer 70 uses instructions translated by an instruction decoder 304 to serve as a data buffer for input data 306 or inner loop-back intermediate data 90 (e.g., from the feedback path 88 shown in FIGS. 3 and 4). The instruction decoder 304 may decode instructions into, for example, instructions for matrix size, batch size, and function to be performed. The core of the main buffer 70 includes N first-in first-out (FIFO) buffers 310 for matrix buffering and at least one FIFO buffer 312 for vector buffering. The main buffer 70 supports N+1 data read and write in parallel (where N is the size of one matrix row or column). There are two write control blocks 314 and 316, which relate to the input data 306 and the loop-back intermediate data 90, respectively. The write control blocks 314 and 316, as well as a read control block 316, may generate access signals to the FIFOs 310 and 312 by controlling routing circuitry (e.g., multiplexers (MUXes)) 322, 324, 326, and 328. For example, the write control block 314 may generate access signals 330 and 332 using indications val_M, val_V, start of packet (sop), and end of packet (eop) corresponding to the input data 306. The write control block 316 may generate access signals 334 and 336 using indications val_M, val_V, start of packet (sop), and end of packet (eop) corresponding to the loop-back intermediate data 90. Likewise, the read control block 318 may generate access signals 338 and 340. Monitor circuitry 342 may provide error and ready signals. A parallel to serial (P2S) block 344 may convert a parallel vector into serial form for storage in the FIFO 312.

Thus, input data with length of N in the form of one row or column of a matrix may be fed into N FIFOs 310, and data read from the N FIFOs 310 may be sent to the PE array 76 as one matrix row or column. The write and read control blocks 314, 316, and 318 are used to generate FIFO access signals (e.g., 330, 332, 334, 336, 338, and 340). Some specific data like an identity matrix can also be generated by the read control block 318. The memory 320 may store the FIFO access patterns of each operation (e.g., each type of matrix decomposition). The memory 320 may store read patterns. Table 1 provides one example of a read pattern.

TABLE 1

Information of program A (length, loop time, etc.)
Instruction 1 of program A
Instruction 2 of program A
...
Instruction N of program A
Information of program B (length, loop time, etc.)
Instruction 1 of program B
...

Table 2 illustrates one example instruction structure for the instructions of Table 1.

TABLE 2

| Mode (M) 2 bits | data (M) 16 bits | valid (M) 16 bits | mode (V) 2 bits | data (V) 1 bits | valid (V) 1 bits |
|---|---|---|---|---|---|
| 01: read data from FIFOs 10: constant data | Available only when mode = '10': Each bit represents an element of a row. '0': number 0 '1': number 1 | Indicate the validation of each data | 01: read data from FIFO 10: constant data | Only when mode = '10': '0': number 0 '1': number 1 | Indicate the validation of each data |

Figure 20:
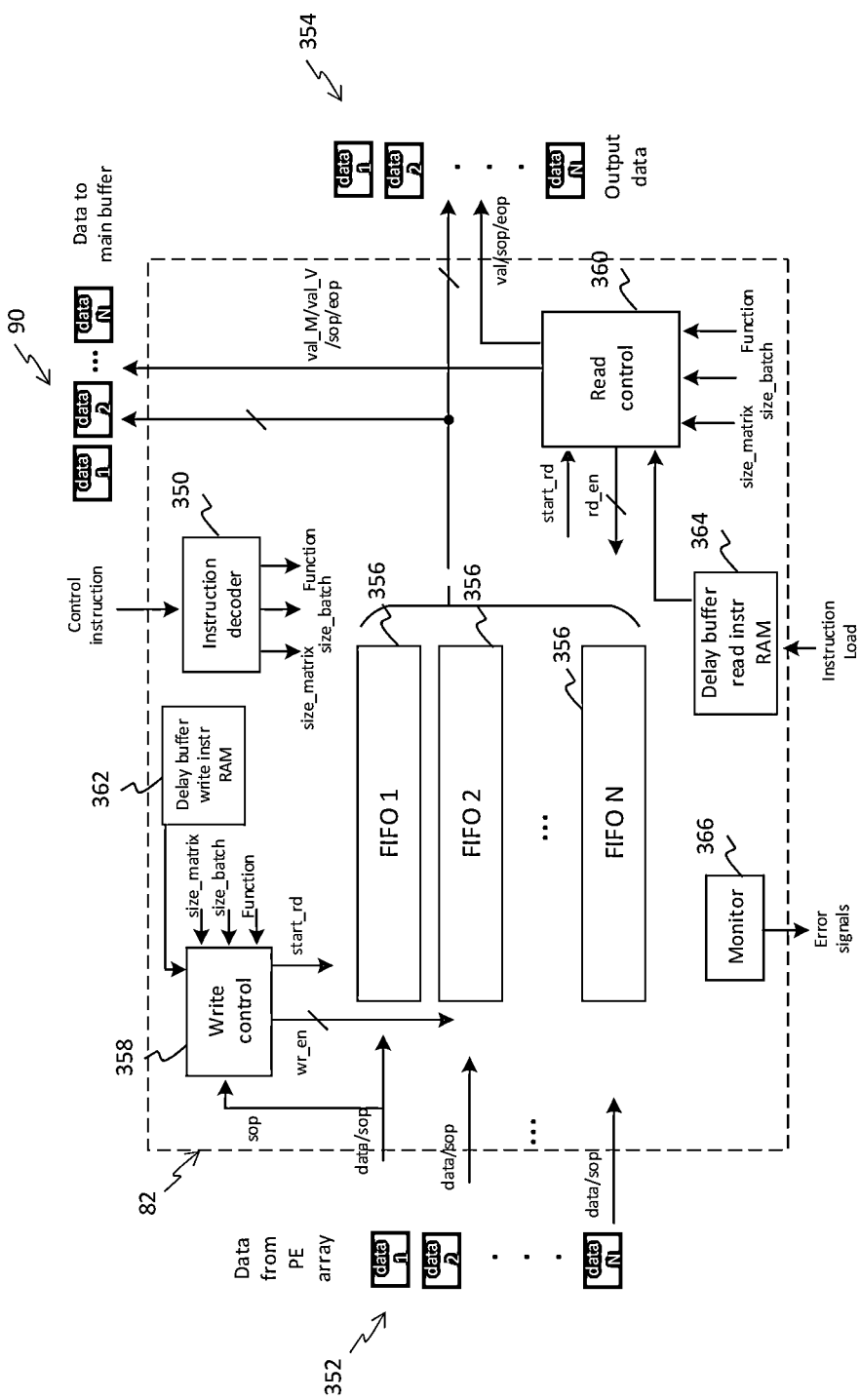
FIG. 20 is a block diagram of a delay alignment buffer that aligns results that were output by the processing element array staggered in time, in accordance with an embodiment.

FIG. 20 shows a block diagram of the delay alignment buffer 82. Similar to the main buffer 70, the delay alignment buffer 82 uses instructions translated by an instruction decoder 350 to align input data 352 that is received from the PE array 76. The delay instruction buffer 82 may output the aligned data as output data 354 or as the inner loop-back intermediate data 90 (e.g., to the feedback path 88 shown in FIGS. 3 and 4). The instruction decoder 350 may decode instructions into, for example, instructions for matrix size, batch size, and function to be performed. The core of the delay alignment buffer 82 includes N first-in first-out (FIFO) buffers 356 for matrix buffering. The pattern of input data 352 to delay alignment buffer is staggered due to the different delays of PE array rows, which may make write control logic of a write control block 358 more complex than that of the main buffer 70.

A read control block 360 is used to make sure that the output of all FIFOs 356 are aligned. For example, the write control block 358 may receive instructions from delay buffer write instruction memory 362 indicating access patterns for the current application and from the instruction decoder 350 indicating, for example, matrix size (size_matrix), batch size (size_batch), and the function that was performed (Function). The write control block 358 may generate write enable (wr_en) signals to write into the FIFOs 356 and a start read (start_rd) signal for the read control block 360. The write control block 358 may trigger some or all of these signals upon receipt of a start of packet (sop) signal corresponding to the input data 352. The read control block 360 may use the start_rd signal from the write control block 358 and instructions from a delay buffer read instruction memory 364 indicating access patterns for the current application. The read control block 360 may also use the instruction decoder 350 indicating, for example, matrix size (size_matrix), batch size (size_batch), and the function that was performed (Function). Monitor circuitry 366 may provide error signals.

Example instructions that may be stored in the delay buffer write instruction memory 362 are shown below in Table 3. One such instruction can serve for a write process for one batch of matrices.

TABLE 3

| Delay of PE array 10 bits | Delay of rows 8 bits | Length of all data (one batch) 12 bits |
|---|---|---|
| Latency between the first input and first output of PE array | Output delay between 2 adjacent rows of PE array. | Length of all the data of a batch in one row of PE array. |

Instructions in the delay buffer read instruction memory 364 may be organized as shown below in Table 4.

TABLE 4

Information of program A (length, loop time, etc.)
Instruction 1 of program A

TABLE 4-continued

Instruction 2 of program A
...
Instruction N of program A
Information of program B (length, loop time, etc.)
Instruction 1 of program B
...

The instructions may be described as shown below in Table 5.

TABLE 5

| valid_M 1 bit | valid_V 1 bit | pattern_V 4 bits |
|---|---|---|
| Indicates that it is a matrix row or column. | Indicates that it is a vector. | Available only when valid_V = '1'. Indicates how many data in vector V are valid. |

In this way, the delay buffer 82 may use the N FIFOs 356 to buffer both matrices and vectors. The input data 352 from the PE array 76 arrive in a staggered pattern, which is different from that of the main buffer 70. The write control block 358 is responsible for writing the data into alignment addresses of all the FIFOs 356. The read control block 360 causes data to be read from the FIFOs 356 and sent to the output port as output data 354 or looped back to the main buffer 70 as the loop-back intermediate data 90.

Instruction Set Architecture (ISA) of PE Array

Figure 21:
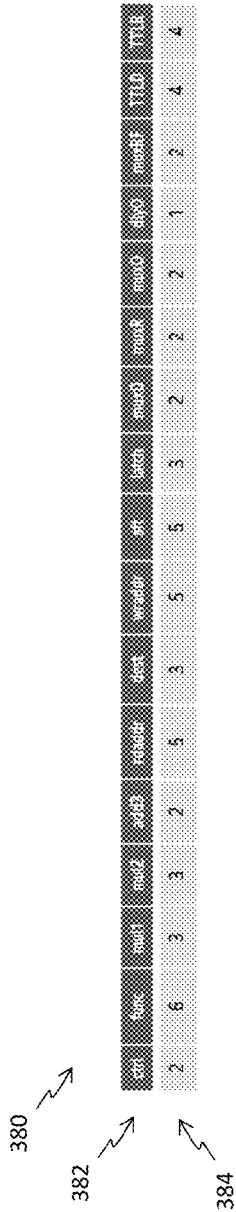
FIG. 21 is an example data structure of an instruction that may program multiply-accumulate (M) processing elements (PEs) of the processing element array, in accordance with an embodiment.

ISA for an M PE 112. The behavior of each M PE 112 is controlled by the instruction it receives. An instruction contains the arithmetic operation to be performed and the routing selection of each signal. FIG. 21 shows one example of a data structure for an instruction 380 for an arithmetic mode of operating the M PEs 112. The data structure for the instruction 380 is shown to include a number of different possible domains 382 represented by a corresponding number of bits 384. Table 6, Table 7, and Table 8 describe each domain of the instruction.

TABLE 6

| ctrl | | func | | mul1 | mul2 | add3 |
|---|---|---|---|---|---|---|
| 2 bits Mode of this instruction. "NOP" means no operation. | | 2 bits Conjugate for complex number case (' for conjugate). | 4 bits Type of arithmetic operation. | 3 bits Source of $1^{st}$ operand of ALU. | 3 bits Source of $2^{nd}$ operand of ALU. | 2 bits Source of $3^{rd}$ operand of ALU. |
| 00 | NOP | 00 | A B | 0000 NOP | 000 0 | 00 0 | 00 L_dat |
| 01 | Configure | 01 | A B' | 0001 A*B | 001 U_dat | 01 U_dat | 01 U_dat |
| 10 | Arithmetic | 10 | A' B | 001x NOP | 010 RF | 10 RF | 10 RF |
|  |  | 11 | A' B' | 0100 A + B | 011 latch | 11 Latch | 11 latch |
|  |  |  |  | 0101 A − B | 100 L_dat | 100 L_dat |  |
|  |  |  |  | 0110 B − A | 101 in_dat |  |  |
|  |  |  |  | 0111 NOP |  |  |  |
|  |  |  |  | 1000 A*B + C |  |  |  |
|  |  |  |  | 1001 A*B − C |  |  |  |
|  |  |  |  | 1010 C − A*B |  |  |  |
|  |  |  |  | 1011 NOP |  |  |  |
|  |  |  |  | 1100 Mul & Acc |  |  |  |
|  |  |  |  | 1101 Mul & Acc start |  |  |  |
|  |  |  |  | 1110 Mul & Acc end |  |  |  |
|  |  |  |  | 1111 NOP |  |  |  |

TABLE 7

| rdaddr | dest | wraddr | sft | latch |
|---|---|---|---|---|
| 5 bits | 3 bits | 5 bits | 5 bits | 3 bits |
| Read address of RF | Destination of ALU output. | Write address of RF | Bit shift length upon MAC output | Write value of selected operand of ALU into latch register. |
|  | 000 NULL |  |  | 000 No latch |
|  | 001 D_dat |  |  | 001 Latch mul1 |
|  | 010 R_dat |  |  | 010 Latch mul2 |
|  | 011 out_dat |  |  | 100 Latch add3 |

TABLE 7-continued

| rdaddr | dest | wraddr | sft | latch |
|---|---|---|---|---|
| 5 bits | 3 bits | 5 bits | 5 bits | 3 bits |
| Read address of RF | Destination of ALU output. | Write address of RF | Bit shift length upon MAC output | Write value of selected operand of ALU into latch register. |
|  | 100 RF |  |  | 011 Latch mul1&mul2 |
|  | ... |  |  | ... |

TABLE 8

| muxD | muxR | muxO | dlyO | muxRF | TTLD | TTLR |
|---|---|---|---|---|---|---|
| 2 bits | 2 bits | 2 bits | 1 bit | 2 bits | 5 bits | 5 bits |
| Multiplex of D_dat | Multiplex of R_dat | Multiplex of out_dat | Output delay | Multiplexer of RF write | Time to live (TTL) vertical. | Time to live (TTL) horizontal. |
| 00 0 | 00 L_dat | 00 Input | 0 0 | 00 L_dat | TTLD = TTLD−1 when instruction crosses rows. | TTLR = TTLR−1 when instruction goes horizontally. |
| 01 (ena_D = 0) | 01 0 | 01 0 | 1 idxM d (index of M PE, equals to the column number in array) | 01 (wren = 0) |  |  |
| 10 L_dat | 10 U_dat | 10 U_dat |  | 1x L_dat |  |  |
| 11 U dat RF | 11 RF | 11 RF |  | U_dat |  |  |

Figure 22:
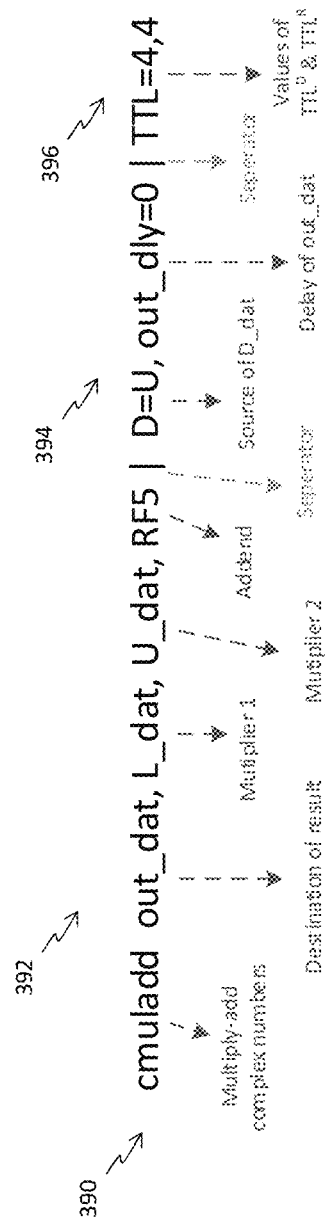
FIG. 22 is an example data structure of an assembly code for multiply-accumulate (M) processing elements (PEs) of the processing element array, in accordance with an embodiment.

Assembly language for an M PE 112. To display instructions in a more readable way, the instructions may be visualized in an assembly-like language: Assembly for M PE (ASMMPE). This is an assembly language designed for matrix decomposition using the PE array 76. FIG. 22 provides an example of ASMMPE code 390 and its mapping to binary instruction. The ASMMPE code 390 includes a first part 392 that describes the main arithmetic operation and an output destination, a second part 394 that describes routing signals (e.g., a source of the data and delay of the output data), and a third part 396 that describes the time-to-live (TTL) values. There is a separator T to divide them. Table 9 illustrates corresponding binary instructions for the assembly code 390 of FIG. 22.

TABLE 9

| ctrl | func | mul1 | mul2 | add3 | raddr | dest | wraddr |
|---|---|---|---|---|---|---|---|
| 10 | 001000 | 100 | 001 | 10 | 00101 | 011 | 00000 |

| latch | muxD | muxR | muxO | Oldy | muxRF | TTLD | TTLR |
|---|---|---|---|---|---|---|---|
| 000 | 10 | 00 | 10 | 0 | 0 | 00100 | 00100 |

Below, Table 10 provides various keywords that may be used by the ASMMPE language.

TABLE 10

| | |
|---|---|
| operation (func) | add: addition |
| | sub: subtraction |
| | cadd: addition of complex numbers |
| | csub: subtraction of complex numbers |
| | mul: multiplication |
| | cmul: multiplication of complex numbers |
| | cjmul: multiplication of A and B conjugate |
| | jcmul: multiplication of A conjugate and B |
| | jcmuladd: A'*B + C |
| | ncjmulsub: C − A*B' |
| | cmulacc: multiply-accumlate |
| Source | L_dat: left input |
| | U_dat: upper input |
| | RFxx: address xx of RF |
| | latchxx: the xx latch |
| | in_dat: input data |

TABLE 10-continued

| | |
|---|---|
| Destination | D_dat: down output |
| | R_dat: right output |
| | out_dat: output data |
| | RF: address of RF |
| Bit shift | sft = xx: right shift xx bits |
| Latch register | latch = 1: hold value of source 1 to latch |
| | latch = 2: hold value of source 2 to latch |
| | latch = 3: hold value of source 3 to latch |
| Source of D_dat | Default: D_dat = 0 |
| | muxD = L: D_dat = L_dat |
| | muxD = U: D_dat = U_dat |
| Source of R_dat | Default: R_dat = L_dat |
| | muxR = 0: R_dat = 0 |
| | muxR = U: R_dat = U_dat |
| Source of out_dat | Default: out_dat = in_dat |
| | muxO = 0: out_dat = 0 |
| Delay of out_dat | Oldy = 0: output delay = 0 |
| | Oldy = 1: output delay = idxM (index of M PE, equals to the column number of the M PE in the PE array) |
| Source of RF write | Default: wren = 0 |
| | RFxx = L: write L_dat to RF with address xx |
| | RFxx = U: write U_dat to RF with address xx |
| TTLD & TTLR | TTL = x1, x2: $TTL^D$ = x1, $TTL^R$ = x2. Default value of TTL = max |

ISA for a D PE 110. The behavior of each D PE 110 is also controlled by the instruction it receives. An instruction for the D PEs 110 includes five sub-instructions, where each sub-instruction belongs to one issue slot. As may be appreciated, when the D PEs 110 include more or fewer issue slots, there may be correspondingly more or fewer sub-instructions. As mentioned above, multiple issue slots work simultaneously to achieve a pipeline effect. Each issue slot runs just under its corresponding sub-instruction, and time offsets among multiple issue slots may also be specified by the program. Table 11, Table 12, Table 13, and Table 14 show an example instruction structure of the four kinds of issue slot discussed above with reference to FIGS. 10-12.

TABLE 11

| ctrl | | write address | |
|---|---|---|---|
| 2 bits Mode of this instruction. | | 2 bits RF bank selection | 6 bits Write address of RF |
| 00 | NOP | 00 | RF1 |
| 01 | Configure | 01 | RF2 |
| 10 | Arithmetic | 10 | RF3 |

TABLE 12

| ctrl | | | | Rd addr | | Wr addr | | |
|---|---|---|---|---|---|---|---|---|
| 2 bits Mode of this instruction. | source 1 bit Source of input | dest 1 bit Destination of output | | 6 bits 2 bits Read RF bank selection | address of RF | 6 bits 2 bits Write RF bank selection | address of RF | sft 5 bits Bit shift of result |
| 00 | NOP | 0 | RF | 0 | RF | 00 RF1 | | 00 RF1 | |
| 01 | Configure | 1 | U_dat | 1 | R_dat | 01 RF2 | | 01 RF2 | |
| 10 | Arithmetic | | | | | 10 RF3 | | 10 RF3 | |

TABLE 13

|  | ctrl<br>2 bits<br>Mode of this<br>instruction. | Source1<br>2 bit<br>Source of<br>input 1 | Source2<br>2 bit<br>Source of<br>input 2 | dest<br>2 bit<br>Destination<br>of output | Rd addr of source 1&2 | | Wr addr | |
|---|---|---|---|---|---|---|---|---|
|  |  |  |  |  | 2 + 2 bits<br>RF bank<br>selection | 6 + 6<br>bits<br>Read<br>address<br>of RF | 2 bits<br>RF bank<br>selection | 6 bits<br>Write<br>address<br>of RF |
| 00 | NOP | 00 RF | 00 RF | 00 RF | 00 RF1 |  | 00 RF1 |  |
| 01 | Configure | 01 U_dat | 01 U_dat | 01 R_dat | 01 RF2 |  | 01 RF2 |  |
| 10 | Arithmetic | 10 latch | 10 latch | 10 acc | 10 RF3 |  | 10 RF3 |  |

| sft<br>5 bits<br>Bit shift of result | latch<br>1 bit<br>Hold value of source<br>into latch register | | addend<br>1 bit<br>Whether to add ACC | |
|---|---|---|---|---|
|  | 0 | Source 1 | 0 | 0 |
|  | 1 | Source 2 | 1 | acc |

TABLE 14

| ctrl<br>2 bits<br>Mode of this<br>instruction. | source<br>1 bit<br>Source of<br>input | dest<br>1 bit<br>Destination<br>of output | Rd addr | |
|---|---|---|---|---|
|  |  |  | 2 bits<br>RF bank<br>selection | 6 bits<br>Read address<br>of RF |
| 00 NOP | 0 RF | 0 R_dat | 00 RF1 |  |
| 01 Configure | 1 U_dat | 1 out_dat | 01 RF2 |  |
| 10 Arithmetic |  |  | 10 RF3 |  |

Each issue slot instruction may also include a time-to-live (TTL) domain to indicate whether that instruction should be executed or ignored (e.g., as NOP). For example, the TTL of an instruction for a D PE 110 may have a data structure as described in Table 15.

TABLE 15

| TTL of D PE | | | | |
|---|---|---|---|---|
| IS 1 | IS 2 | IS 3 | IS 4 | IS 5 |
| 5 bits | 5 bits | 5 bits | 5 bits | 5 bits |

Processes of Matrix Decomposition on the
Programmable Spatial Array Processor

Figure 23:
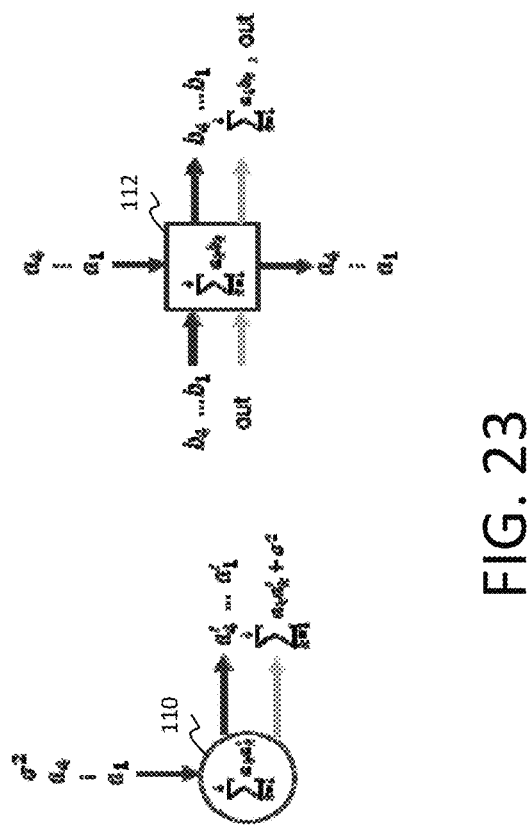
FIG. 23 is a block diagram illustrating types of computations that may be carried out by a diagonal (D) processing element (PE) and a multiply-accumulate (M) processing element (PE) of the processing element array to perform Cholesky decomposition, in accordance with an embodiment.

The programmable spatial array processor 26 may be programmable to perform a wide variety of types of matrix decompositions. This section will describe the following types of matrix decompositions:
Cholesky decomposition
LU decomposition
Cholesky based MMSE
Givens-Rotation QR based MMSE
Gram-Schmidt QR decomposition The D PE 110 and M PE 112 may have a dataflow as illustrated in FIG. 23. In FIG. 23, sequential input signals come from upper or left side and output signals go out the lower or right side. The equation in the circle or square shows the calculation that the D PE 110 and M PE 112 performs. The dashed arrows are the paths of result (output) signals.

Cholesky decomposition. Cholesky decomposition aims to find a lower triangular matrix L that satisfies L*L'=A. A is given as a positive definite Hermitian matrix:

$$A = L \cdot L^H$$

The procedure of Cholesky decomposition is (R=A):

```
for (k=1 to N)
    L_{k:N,k} = R_{k:N,k}/sqrt(R_{k,k})
    L_{1:k-1,k} = 0
    for (j=k+1 to N)
        R_{j:N,j} = R_{j:N,j} - L_{j:N,k} * L_{j,k}'
    end
end
```

Figure 24:
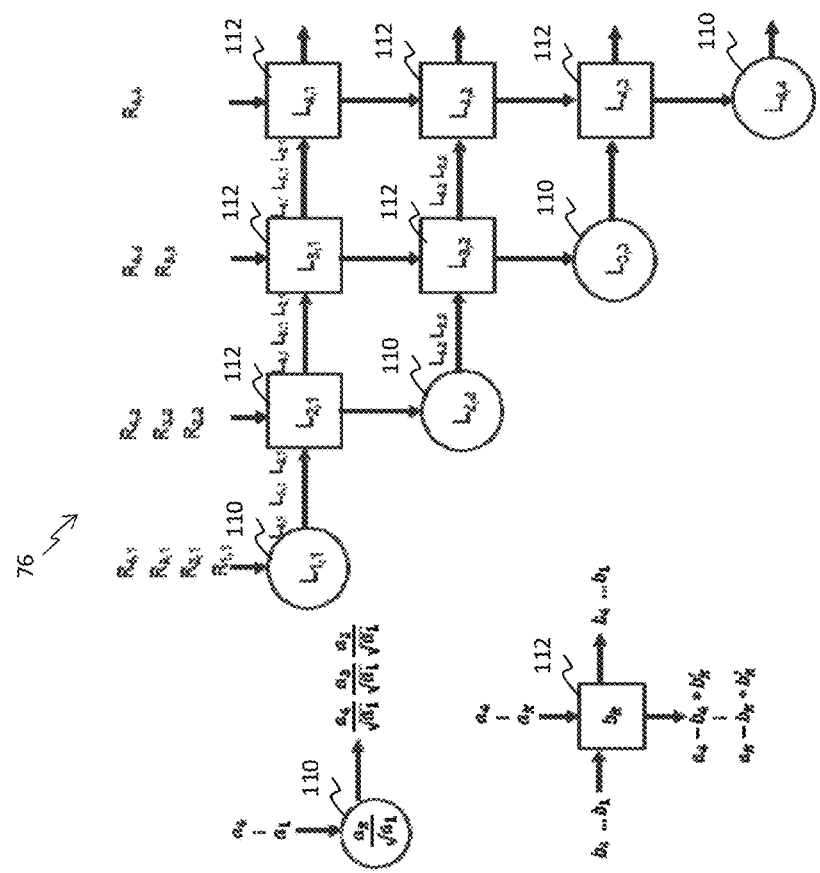
FIG. 24 is a block diagram of computations that may be carried out by the processing element array to perform Cholesky decomposition, in accordance with an embodiment.

FIG. 24 illustrates the dataflow of Cholesky decomposition in the PE array 76 of the programmable spatial array processor 26. As seen in FIG. 24, the result $L_{i,j}$ is buffered in the PEs 110 and 112. The horizontal instruction propagation delay may be set to 2 for Cholesky decomposition. The assembly codes of Cholesky decomposition are as below. Namely, the assembly code for Cholesky decomposition for a D PE 110 is shown in Table 16 and the assembly code for Cholesky decomposition for an M PE 112 is shown in Table 17.

TABLE 16

| Input<br>(IS1) | Isqrt<br>(IS 2) | MAC<br>(IS3) | MAC<br>(IS4) | Output<br>(IS5) |
|---|---|---|---|---|
| mv RF1_1, U_dat | isqrt RF2_1, U_dat |  |  |  |
| mv RF1_2, U_dat |  |  |  |  |
| mv RF1_3, U_dat |  |  |  |  |
| mv RF1_4, U_dat |  |  |  |  |
| mv RF1_5, U_dat | isqrt RF2_2, U_dat |  |  |  |

TABLE 16-continued

| Input (IS1) | Isqrt (IS 2) | MAC (IS3) | MAC (IS4) | Output (IS5) |
|---|---|---|---|---|
| mv RF1_6, U_dat | | | | |
| mv RF1_7, U_dat | | | | |
| mv RF1_8, U_dat | | | | |
| ... | ... | | | |
| | | cmul RF3_1, RF1_1, RF2_1 \| latch = 2 | | |
| | | cmul R_dat, RF1_2, latch | | |
| | | cmul R_dat, RF1_3, latch | | |
| | | ... | | |

TABLE 17 ncjmulsub D_dat, L_dat, L_dat, U_dat | latch=2, RF1=L
ncjmulsub D_dat, L_dat, latch, U_dat | TTL=max,2
ncjmulsub D_dat, L_dat, latch, U_dat | TTL=max,1
NOP
...

LU decomposition. The programmable spatial array processor 26 can also be used to perform LU decomposition. LU (lower-upper) decomposition factors matrix A as production of a lower triangular matrix L and an upper triangular matrix U:

$$A = L * U$$

Example Matlab code of LU decomposition is shown below:

```
L = eye(N);
U = R_ori;
for k=1:N
    L(k+1:N, k) = U(k+1:N, k) / U(k,k);
    for j=k+1:N
        U(j, k+1:N) = U(j, k+1:N) - L(j, k).*U(k, k+1:N);
    end
    U(k, 1:k-1) = 0;
end
```

Figure 25:
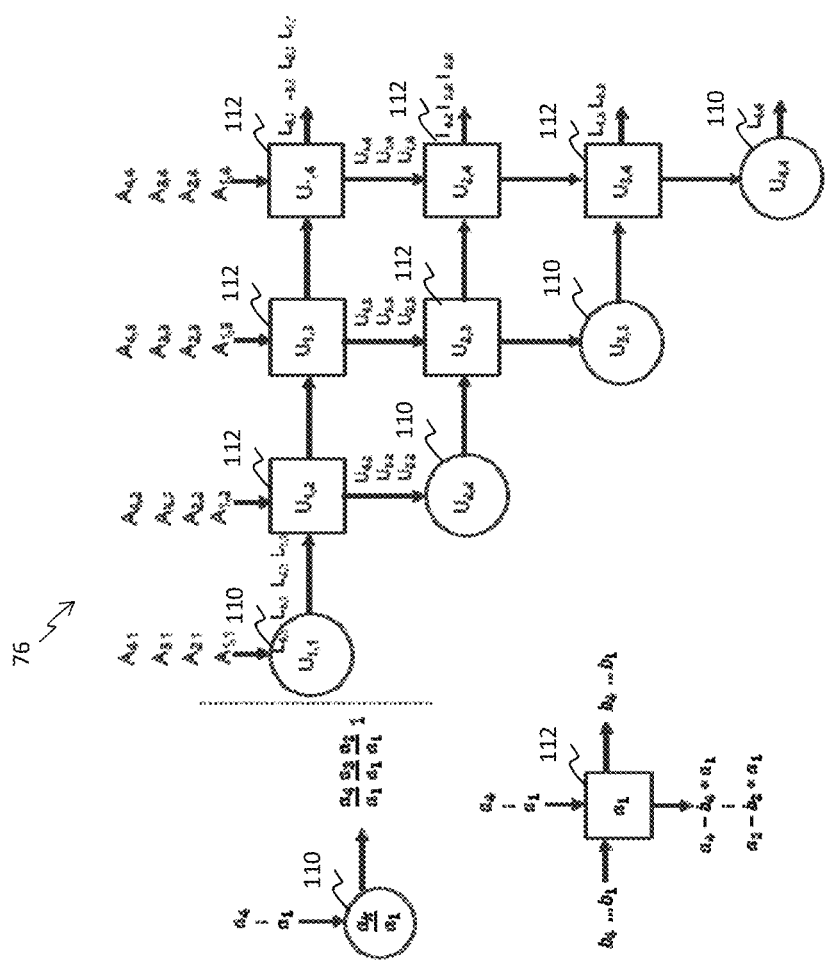
FIG. 25 is a block diagram illustrating types of computations that may be carried out by the processing element array to perform LU decomposition, in accordance with an embodiment.

FIG. 25 illustrates the dataflow of LU decomposition through the D PEs 110 and M PEs 112 of the PE array 76. The assembly code to perform LU decomposition for a D PE 110 is shown in Table 18 and the assembly code to perform LU decomposition for an M PE 112 is shown in Table 19.

TABLE 18

| Input (IS1) | Isqrt (IS 2) | MAC (IS3) | MAC (IS4) | Output (IS5) |
|---|---|---|---|---|
| mv RF1_1, U_dat | isqrt RF2_1, U_dat | | | |
| mv RF1_2, U_dat | | | | |
| mv RF1_3, U_dat | | | | |
| mv RF1_4, U_dat | | | | |
| mv RF1_5, U_dat | isqrt RF2_2, U_dat | | | |
| mv RF1_6, U_dat | | | | |
| mv RF1_7, U_dat | | | | |
| mv RF1_8, U_dat | | | | |
| ... | ... | | | |
| | | cmul RF2_1, RF2_1, RF2_1 | | |
| | | cmul RF2_2, RF2_2, RF2_2 | | |
| | | | cadd RF3_1, RF1_1, 0 | |
| | | | cmul R_dat, RF2_1, RF1_2 | |
| | | | cmul R_dat, RF2_1, RF1_3 | |
| | | ... | cmul R_dat, RF2_1, RF1_4 | |
| | | | ... | |

TABLE 19

```
nop 0, 0, U_dat | latch=2, RF1=U
ncmulsub D_dat, L_dat, latch, U_dat | TTL=3,max
ncmulsub D_dat, L_dat, latch, U_dat | TTL=2,max
ncmulsub D_dat, L_dat, latch, U_dat | TTL=1,max
...
```

Cholesky-based minimum mean square error (MMSE). The programmable spatial array processor 26 can also be used to perform Cholesky-based MMSE. An example procedure for performing Cholesky-based MMSE is provided below:

Description of input signals:
MIMO channel coefficients H: N×N complex matrix,
Noise power $\sigma^2$: real scalar,
Received signal Y: N×1 complex vector
The Final Result is:

$$x=(H^H H+\sigma^2 I)^{-1} H^H Y$$

To implement it on the PE array 76, the procedure is divided into 4 stages:
Pre-Filtering $$A=H^H \cdot H,$$

$$R=A+\sigma^2 \cdot I$$

$$Z=H^H \cdot Y.$$

Cholesky Decomposition $$R=L \cdot L^H$$

Back Substitution & V*Z $$V=L^{-1}$$

$$VZ=V*Z$$

$$V^{H}*(VZ)$$

$$x=V^{H}*(VZ)$$

Figure 26:
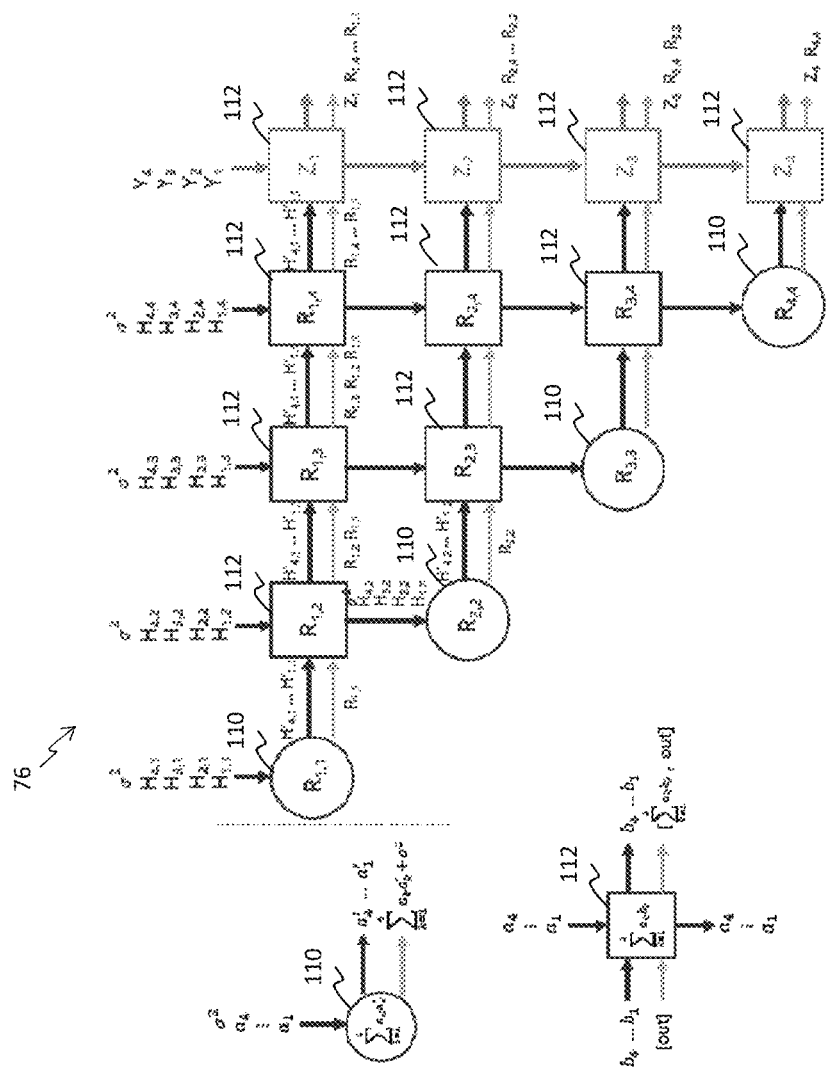
FIG. 26 is a block diagram illustrating types of computations that may be carried out by the processing element array to perform pre-filtering for Cholesky-based minimum mean square error (MMSE), in accordance with an embodiment.

Reviewing each stage of Cholesky-based MMSE, pre-filtering may take place in the PE array 76 as illustrated by FIG. 26. Sequential input signals come from upper or left side and output signals go out the lower or right side. The dashed arrows are the paths of result (output) signals. The assembly code to perform pre-filtering for a D PE 110 is shown in Table 20 and the assembly code to perform pre-filtering for an M PE 112 is shown in Table 21.

TABLE 20

| Input (IS1) | Isqrt (IS 2) | MAC (IS3) | MAC (IS4) | Output (IS5) |
|---|---|---|---|---|
| | | cjmul acc, U_dat, U_dat | | jmv R_dat, U_dat |
| | | cjmuladd acc, U_dat, U_dat, acc | | jmv R_dat, U_dat |
| | | cjmuladd acc, U_dat, U_dat, acc | | jmv R_dat, U_dat |
| | | cjmuladd acc, U_dat, U_dat, acc | | jmv R_dat, U_dat |
| | | cmuladd out_dat, U_dat, 1, acc | | ... |
| | | ... | | |

TABLE 21

```
cmulacc acc, L_dat, U_dat | D=U
cmulacc acc, L_dat, U_dat, acc | D=U
cmulacc acc, L_dat, U_dat, acc | D=U
cmulacc O_dat, L_dat, U_dat, acc | D=U, Odly=idxM
...
```

After pre-filtering, the second stage of Cholesky-based MMSE is Cholesky decomposition. This may take place in the same way described above. After Cholesky decomposition, Cholesky-based MMSE continues with back substitution and V*Z. Back substitution is used to solve $V=L^{-1}$ in which L is an upper triangular matrix. V*Z is a matrix (V) vector (Z) multiplication:

$$V=L^{-1}$$

$$V*Z$$

The procedure of back substitution may be described as:

```
for (i=1 to N)
    V_{i,i} = 1/L_{i,i}
end
for (i=2 to N)
    for (j=1 to i-1)
        V_{i,j} = -V_{i,i} * (Σ_{m=1}^{i-1} L_{i,m} * V_{m,j})
    end
end
```

Figure 27:
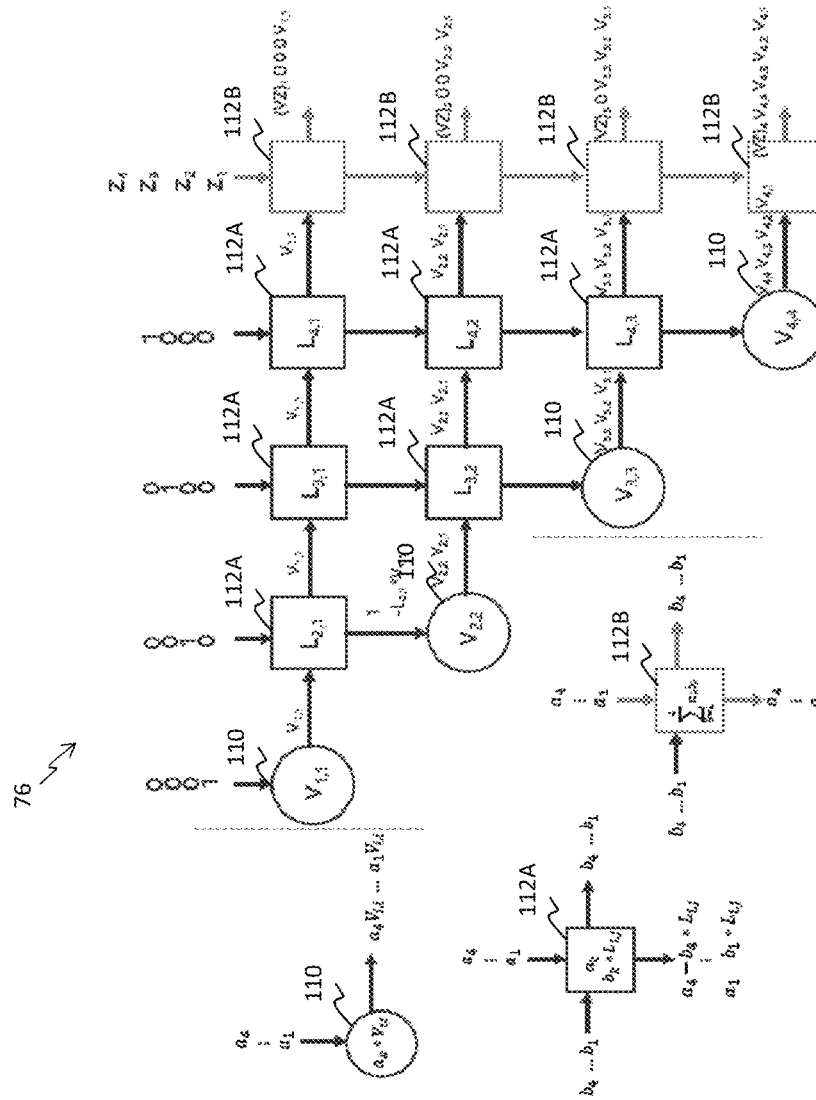
FIG. 27 is a block diagram illustrating types of computations that may be carried out by the processing element array to perform back substitution and V*Z for Cholesky-based minimum mean square error (MMSE), in accordance with an embodiment.

FIG. 27 shows the dataflow of back substitution and V*Z in the PE array 76 (in this example, 4×4). The $V_{i,i}$ and $L_{i,j}$ are already buffered in corresponding PEs at the Cholesky decomposition stage. Final results output to the right side. In FIG. 27, the M PEs 112 are shown as M PEs 112A or 112B depending on the operation they perform at this stage. The assembly code to perform back substitution for a D PE 110 is shown in Table 22 and the assembly code to perform back substitution for an M PE 112 is shown in Table 23.

TABLE 22

| Input (IS1) | Isqrt (IS 2) | MAC (IS3) | MAC (IS4) | Output (IS5) |
|---|---|---|---|---|
| | | cmul R_dat, U_dat, RF3_1 | | |
| | | cmul R_dat, U_dat, RF3_1 | | |
| | | cmul R_dat, U_dat, RF3_1 | | |
| | | cmul R_dat, U_dat, RF3_1 | | |
| | | ... | | |

TABLE 23

```
ncmulsub D_dat, L_dat, RF1, U_dat
ncmulsub D_dat, L_dat, RF1, U_dat
ncmulsub D_dat, L_dat, RF1, U_dat
ncmulsub D_dat, L_dat, RF1, U_dat
...
```

The fourth stage of Cholesky-based MMSE is to calculate $V^{H}*(VZ)$:

$$V^{H}*(VZ)$$

Figure 28:
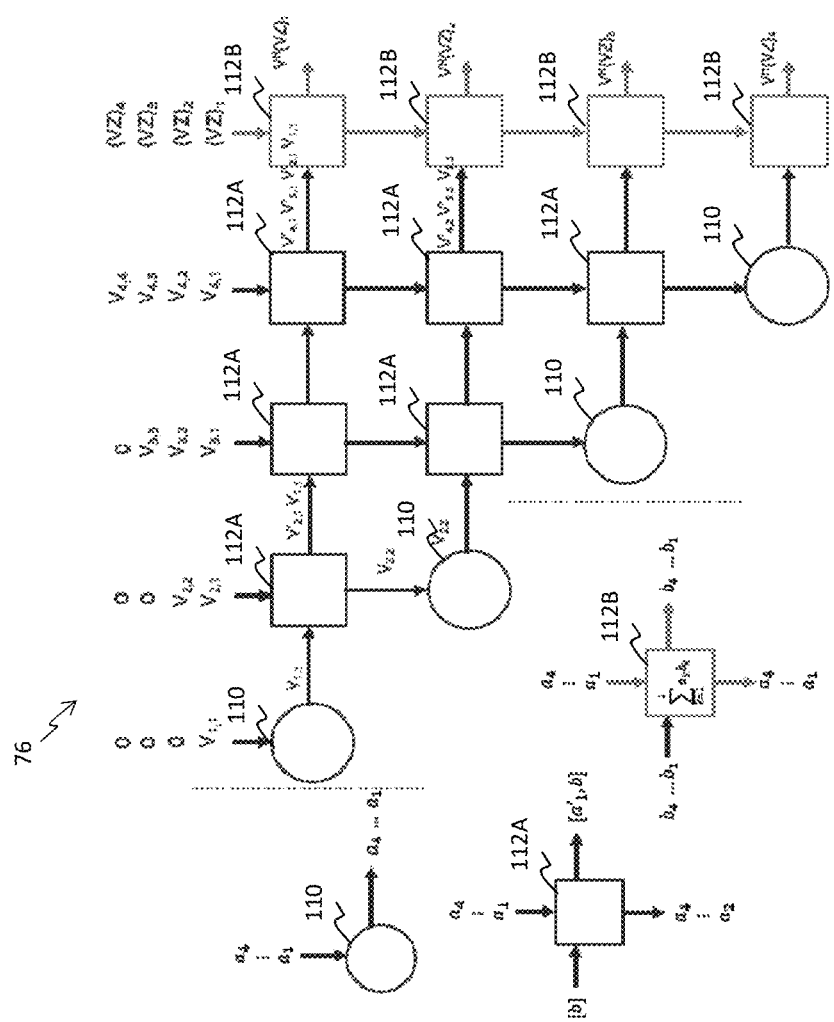
FIG. 28 is a block diagram illustrating types of computations that may be carried out by the processing element array to perform $V^H*(VZ)$ for Cholesky-based minimum mean square error (MMSE), in accordance with an embodiment.

FIG. 28 shows the dataflow for calculating $V^{H}*(VZ)$ in the PE array 76. Final results output to the right side. In FIG. 28, the M PEs 112 are shown as M PEs 112A or 112B depending on the operation they perform at this stage. The horizontal instruction propagation delay may be set to 2 to calculate $V^H$ (V transpose). The assembly code to perform $V^H*(VZ)$ for a D PE 110 is shown in Table 24 and the assembly code to perform $V^H*(VZ)$ for an M PE 112 is shown in Table 25.

TABLE 24

| Input (IS1) | Isqrt (IS 2) | MAC (IS3) | MAC (IS4) | Output (IS5) |
|---|---|---|---|---|
| | | | | mv R_dat, U_dat |
| | | | | mv R_dat, U_dat |
| | | | | ... |

TABLE 25 nop | R=U
nop | D=U | TTL=3,max
nop | D=U | TTL=2,max
nop | D=U | TTL=1,max
...

Givens-Rotation QR based MMSE. Givens Rotation based QR decomposition (GR-QRD) uses a series of Givens rotation operations to eliminate the entries of a lower triangular part of R. One Givens rotation can zero the lower element of a 2×1 vector:

$$\begin{bmatrix} \alpha^* & \beta^* \\ -\beta & \alpha \end{bmatrix} * \begin{bmatrix} a \\ b \end{bmatrix} = \begin{bmatrix} \sqrt{a^2+b^2} \\ 0 \end{bmatrix}$$

The $\alpha$ and $\beta$ may be calculated as:

$\alpha = a/\sqrt{a^2+b^2}$ $\beta = b/\sqrt{a^2+b^2}$

The entire procedure of QR decomposition may be described as:
Rotate the 1st and 2nd row of A to zero A(2,1).

$Q^*_1 A = R_1$

Then rotate the 1st and 3rd row of A to zero A(3,1).

$Q^*_2 Q^*_1 A = R_2$

The last step is to rotate the N−1th and Nth row of A to zero A(N,N−1).

$Q^*_m \ldots Q^*_2 Q^*_1 A = R$

Finally we get $A = QR (Q = Q_1 Q_2 \ldots Q_m)$

The MATLAB code of above procedure is:

```
Q = eye(n);
R = A;
for k=1:1%n-1
    for j=k+1:n
        alp = R(k,k) / sqrt(R(k,k)*R(k,k)' + R(j,k)*R(j,k)');
        bet = R(j,k) / sqrt(R(k,k)*R(k,k)' + R(j,k)*R(j,k)');
        R([k,j],:) = [alp', bet'; -bet, alp] * R([k,j],:);
        Q(:, [k,j]) = Q(:, [k,j]) * [alp, -bet'; bet, alp'];
    end
end
```

In many cases, there is no need to obtain the Q matrix explicitly. For instance, the QRD based MMSE may include the following:
Calculate $H^H H + \sigma^2 I$ and $H^H Y$.
Perform QRD on $H^H H + \sigma^2 I$, get R.
Perform back substitution to get $R^{-1}$.
Get $x = (QR)^{-1} H^H Y = R^{-1} (Q^H H^H Y)$ One question about QRD is how to get $Q^H$ if there is no explicit Q calculation. The answer is that when Givens rotation is performed on $H^H H + \sigma^2 I$, it should also be performed on $H^H Y$ simultaneously as below equation shows:

$[QR, H^H Y]$—Givens Rotations—$>[R, Q^H H^H Y]$

Figure 29:
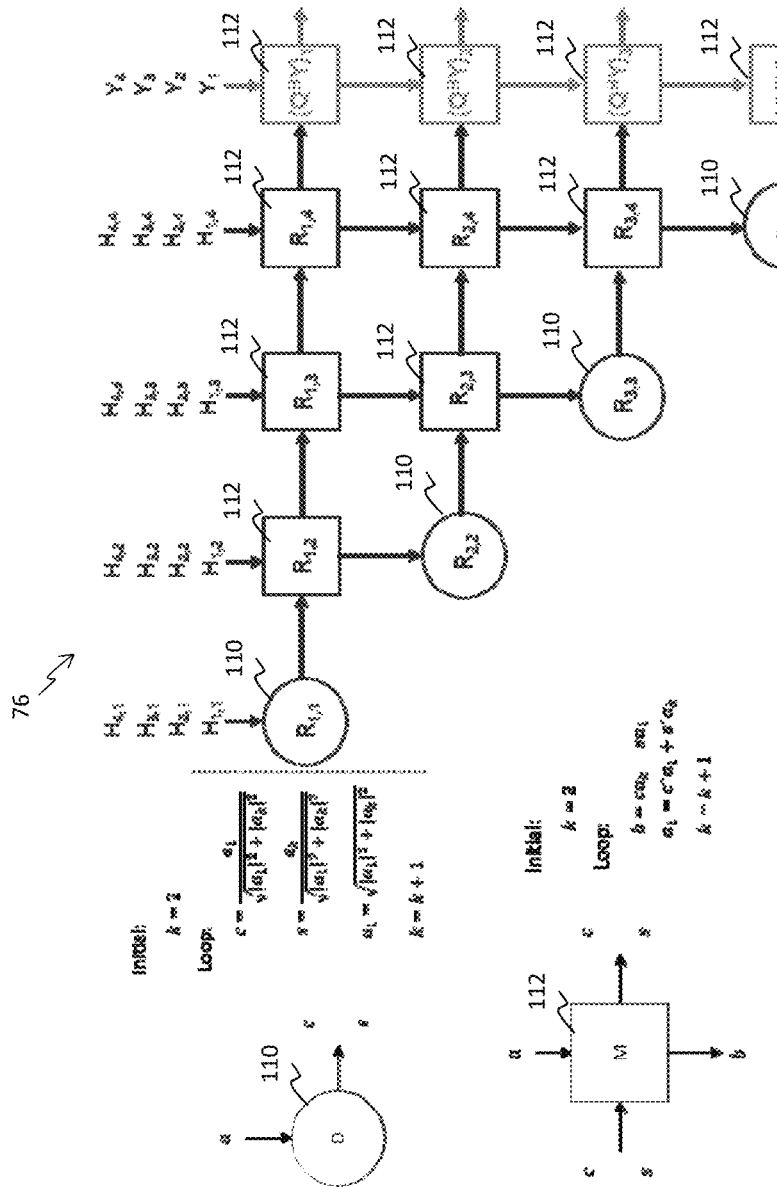
FIG. 29 is a block diagram illustrating types of computations that may be carried out by the processing element array to perform Givens-rotation QR based minimum mean square error (MMSE) (GR-QRD), in accordance with an embodiment.
Figure 30:
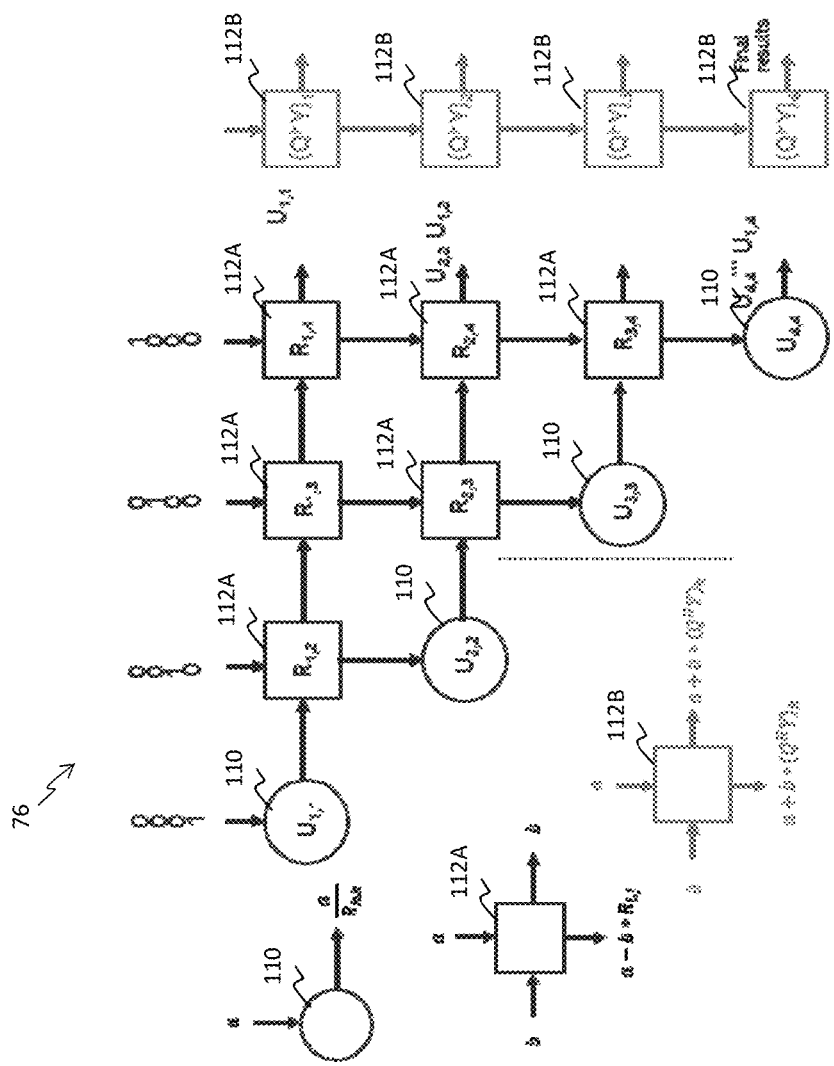
FIG. 30 is a block diagram illustrating types of computations that may be carried out by the processing element array to perform back substitution for GR-QRD, in accordance with an embodiment.

FIG. 29 shows the dataflow for GR-QRD in the PE array 76. Back substitution of R and the calculation of $R^{-1}(Q^H Y)$ $(Q^H Y)$ are shown in FIG. 30. Final results output to the right side.

Figure 31:
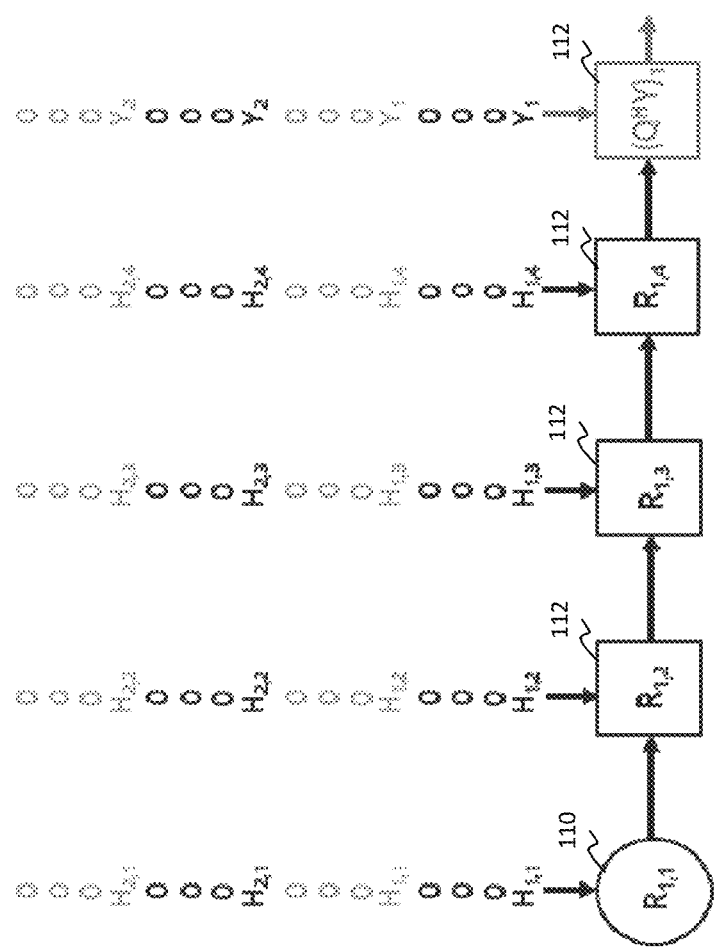
FIG. 31 is a block diagram illustrating a manner of performing interleaved batch GR-QRD using the processing element array, in accordance with an embodiment.

To increase the utilization rate of MAC resources and data throughput, GR-QRD may be performed using an interleaved batch mode. FIG. 31 shows the dataflow of interleaved batch GR-QRD in the PE array 76 (4×4). The input data is not matrix by matrix, but rather an interleaved pattern of matrices. For example, the first row of matrix 1 may be followed by the first row of matrix 2, followed by the second row of matrix 1. The assembly code to perform interleaved batch GR-QRD for a D PE 110 is shown in Table 26 and the assembly code to perform interleaved batch GR-QRD for an M PE 112 is shown in Table 27.

TABLE 26

| Input (IS1) | Isqrt (IS 2) | MAC (IS3) | MAC (IS4) | Output (IS5) |
|---|---|---|---|---|
| mv RF1_1_B1, U_dat | | cjmul RF3_1_B1, U_dat, U_dat | | |
| mv RF1_1_B2, U_dat | | cjmul RF3_1_B2, U_dat, U_dat | | |
| mv RF1_2_B1, U_dat | | cjmuladd RF3_2_B1, U_dat, U_dat, RF3_1_B1 | | |
| mv RF1_2_B2, U_dat | | cjmuladd RF3_2_B2, U_dat, U_dat, RF3_1_B2 | | |
| ... | isqrt RF2_2_B1, RF3_2_B1 | ... | | |
| | isqrt RF2_2_B2, RF3_2_B2 | | | |
| | isqrt RF2_3_B1, RF3_3_B1 | | cmul RF1_1_B1, RF2_2_B1, RF3_2_B1 | |
| | | | cmul R_dat, RF2_2_B1, RF1_1_B1 (cos) | |
| | | | cmul R_dat, RF2_2_B1, RF1_2_B1 (sin) | |

TABLE 26-continued

| Input (IS1) | Isqrt (IS 2) | MAC (IS3) | MAC (IS4) | Output (IS5) |
|---|---|---|---|---|
| | isqrt RF2__3__B2, RF3__3__B2 . . . | | cmul R__dat, RF2__2__B1, RF1__1__B1 (cos) cmul RF1__1__B2, RF2__2__B2, RF3__2__B2 cmul R__dat, RF2__2__B2, RF1__1__B2 (cos) cmul R__dat, RF2__2__B2, RF1__2__B2 (sin) cmul R__dat, RF2__2__B2, RF1__1__B2 (cos) cmul RF1__1__B1, RF2__3__B1, RF3__3__B1 cmul R__dat, RF2__3__B1, RF1__1__B1 (cos) cmul R__dat, RF2__3__B1, RF1__3__B1 (sin) cmul R__dat, RF2__3__B1, RF1__1__B1 (cos) cmul RF1__1__B2, RF2__3__B2, RF3__3__B2 cmul R__dat, RF2__3__B2, RF1__1__B2 (cos) cmul R__dat, RF2__3__B2, RF1__3__B2 (sin) cmul R__dat, RF2__3__B2, RF1__1__B2 (cos) . . . | |

TABLE 27

```
nop | RF1__B1=U
nop
nop
nop
nop | RF1__B2=U
nop
nop
nop
jcmulacc acc, L__dat, RF1__B1 ; c* .a1
jcmulacc RF1__B1, L__dat, U__dat, acc | latch=1,2 ;
a1=c* .a1+s* .ak
cmulacc acc, L__dat, latch2 ; c.ak
ncmulacc D__dat, latch1, RF1__B1, acc ; b=c.ak−s.a1
jcmulacc acc, L__dat, RF1__B2
jcmulacc RF1__B2, L__dat, U__dat, acc | latch=1,2
cmulacc acc, L__dat, latch2
ncmulacc D__dat, latch1, RF1__B2, acc
...
```

Gram-Schmidt QR decomposition. GS (Gram-Schmidt) QR decomposition is a canonical and widely used matrix decomposition algorithm. The procedure is shown below:

$$A = [a_1, a_2, \ldots, a_N]$$

$$u_1 = a_1$$

$$q_1 = \frac{u_1}{\|u_1\|}$$

$$u_2 = a_2 - \frac{<q_1, a_2>}{<q_1, q_1>} q_1 = a_2 - <q_1, a_2> q_1$$

$$q_2 = \frac{u_2}{\|u_2\|}$$

$$u_3 = a_3 - <q_1, a_3> q_1 - <q_2, a_3> q_2$$

$$q_3 = \frac{u_3}{\|u_3\|}$$

$$\ldots$$

$$u_N = a_N - <q_1, a_N> q_1 - \ldots - <q_{N-1}, a_N> q_{N-1}$$

$$q_N = \frac{u_N}{\|u_N\|}$$

$$Q = [q_1, q_2, \ldots, q_N]$$

$$R = \begin{bmatrix} <q_1, a_1> & <q_1, a_2> & \ldots & <q_1, a_N> \\ 0 & <q_2, a_2> & \ddots & \vdots \\ 0 & 0 & \ldots & <q_N, a_N> \end{bmatrix}$$

Figure 32:
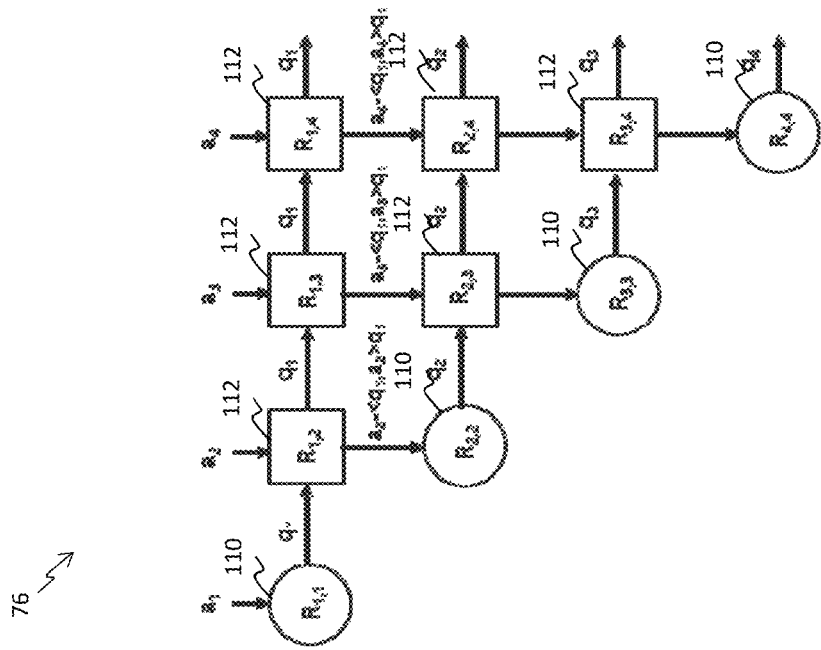
FIG. 32 is a block diagram illustrating types of computations that may be carried out by the processing element array to perform Gram-Schmidt QR decomposition, in accordance with an embodiment.

FIG. 32 is a diagram of GS QR decomposition dataflow on the PE array 76. The terms $a_k$ and $q_k$ are vectors representing the columns of A and Q. Inner product and multiply-subtract operations are used in each M PE 112 and D PE 110 with reciprocal. The assembly code to perform GS QR for a D PE 110 is shown in Table 28 and the assembly code to perform GS QR for an M PE 112 is shown in Table 29.

TABLE 28

| Input (IS1) | Isqrt (IS 2) | MAC (IS3) | MAC (IS4) | Output (IS5) |
|---|---|---|---|---|
| mv RF1__1, U__dat | | | cjmulacc acc, U__dat, U__dat | |
| mv RF1__2, U__dat | | | cjmulacc acc, U__dat, U__dat | |
| mv RF1__3, U__dat | | | cjmulacc acc, U__dat, U__dat | |
| mv RF1__4, U__dat | | | cjmulacc RF2__1, U__dat, U__dat | |
| | isqrt RF2__1, RF2__1 | | | |
| mv RF1__5, U__dat | | | cjmulacc acc, U__dat, U__dat | |

TABLE 28-continued

| Input (IS1) | Isqrt (IS 2) | MAC (IS3) | MAC (IS4) | Output (IS5) |
|---|---|---|---|---|
| mv RF1_6, U_dat | | cjmulacc acc, U_dat, U_dat | cmul RF3_1 &R_dat, RF2_1, RF1_1 | |
| mv RF1_7, U_dat | | cjmulacc acc, U_dat, U_dat | cmul RF3_2 &R_dat, RF2_1, RF1_2 | |
| mv RF1_8, U_dat | | cjmulacc RF2_2, U_dat, U_dat | cmul RF3_3 &R_dat, RF2_1, RF1_3 | |
| | | | cmul RF3_4 & R_dat, RF2_1, RF1_4 | |
| ... | | | | |
| | isqrt RF2_2, RF2_2 | | | mv R_dat, RF3_1 |
| | | | | mv R_dat, RF3_2 |
| | | | | mv R_dat, RF3_3 |
| | | | | mv R_dat, RF3_4 |
| | ... | ... | ... | ... |

TABLE 29

```
; calculate <q, a>
cmulacc acc, L_dat, U_dat | RF1=U_dat
cmulacc acc, L_dat, U_dat | RF2=U_dat
cmulacc acc, L_dat, U_dat | RF3=U_dat
cmulacc RF5, L_dat, U_dat | RF4=U_dat
NOP
...
NOP
; calculate a - <q,a>q
nop, 0, 0, RF5 | latch=2
ncmulsub D_dat, L_dat, latch, RF1
ncmulsub D_dat, L_dat, latch, RF2
ncmulsub D_dat, L_dat, latch, RF3
ncmulsub D_dat, L_dat, latch, RF4
...
```

Average throughput estimation. Tables 30 and 31 provide a rough estimate of the average throughput of the matrix decomposition examples discussed above. The parameters are defined as: matrix size of N×N, the size of one batch (number of matrices in one batch) is LenB, the gap between two consecutive batches is LenG clock cycles, and the delay of multiply-accumulate operations in each M PE 112 is DAcc.

TABLE 30

| Decomposition | Cholesky | LU | Givens-Rotation QR | Gram-Schmidt QR |
|---|---|---|---|---|
| Throughput (cycles per matrix) | $N + \frac{LenG}{LenB}$ | $N + \frac{LenG}{LenB}$ | $4N + \frac{LenG}{LenB}$ | $2N + DAcc + 1 + \frac{LenG}{LenB}$ |

TABLE 31

| Decomposition | Cholesky | LU | Givens-Rotation QR | Gram-Schmidt QR |
|---|---|---|---|---|
| Throughput (cycles per matrix) | N + 1 | N + 1 | 4N + 1 | 2N + 12 |

EXAMPLE EMBODIMENTS

Various example embodiments, representing a non-limiting set of embodiments that may follow from this disclosure, are provided below.

EXAMPLE EMBODIMENT 1. A system comprising:
programmable spatial array processing circuitry comprising:
a processing element array having an array of processing elements, wherein the processing element array:
when programmed with a first instructions, performs a first type of matrix decomposition; and
when programmed with second instructions, performs a second type of matrix decomposition; and
instruction memory that provides a portion of the first instructions or a portion of the second instructions sequentially to one processing element of a row of processing elements to sequentially propagate to other processing elements of the row of processing elements.

EXAMPLE EMBODIMENT 2. The system of example embodiment 1, wherein the array of processing elements has a triangular arrangement.

EXAMPLE EMBODIMENT 3. The system of example embodiment 1, wherein the array of processing elements comprise at least three different types of processing elements.

EXAMPLE EMBODIMENT 4. The system of example embodiment 3, wherein the at least three different types of processing elements comprise:
a first diagonal processing element type that only receives data from above it in the array and only outputs data to a first side in the array;
a second internal processing element type that only receives data from above it in the array and from a second side of it in the array and only outputs data to the first side of it in the array and down from it in the array; and
a third vector processing element type that that only receives data from above it in the array and to from the second side of it in the array and outputs results of the processing element array.

EXAMPLE EMBODIMENT 5. The system of example embodiment 3, wherein the instruction memory comprises:
a first instruction memory that stores instructions for all of the processing elements of a first type of the at least three different types of processing elements;

a second instruction memory that stores instructions for all of the processing elements of a second type of the at least three different types of processing elements; and a third instruction memory that stores instructions for all of the processing elements of a third type of the at least three different types of processing elements.

EXAMPLE EMBODIMENT 6. The system of example embodiment 1, wherein the array of processing elements comprise:

a first processing element having a first architecture that includes a plurality of issue slots; and a second processing element having a second architecture different from the first architecture that includes an arithmetic logic unit (ALU) configurable to perform multiply-accumulate operations.

EXAMPLE EMBODIMENT 7. The system of any of example embodiments 1-6, wherein the one processing element of the row of processing elements and the other processing elements of the row of processing elements do not contain instruction memory to hold more than one instruction at a time.

EXAMPLE EMBODIMENT 8. The system of any of example embodiments 1-6, wherein the first type of matrix decomposition comprises at least one of Cholesky decomposition, LU decomposition, Cholesky-based minimum mean square error (MMSE), Givens-Rotation QR based MMSE, and Gram-Schmidt QR decomposition, and wherein the second type of matrix decomposition comprises a different one of Cholesky decomposition, LU decomposition, Cholesky-based minimum mean square error (MMSE), Givens-Rotation QR based MMSE, and Gram-Schmidt QR decomposition.

EXAMPLE EMBODIMENT 9. The system of any of example embodiments 1-6, comprising host processing circuitry configurable to perform a task that involves performing the first type of matrix decomposition and cause the processing element array to be programmed with the first instructions.

EXAMPLE EMBODIMENT 10. The system of example embodiment 9, comprising a plurality of antennas, wherein the host processing circuitry and the programmable spatial array processing circuitry are configured to perform the first type of matrix decomposition or the second type of matrix decomposition to carry out a multiple-input multiple-output (MIMO) computation.

EXAMPLE EMBODIMENT 11. An article of manufacture comprising one or more tangible, non-transitory, machine readable media comprising instructions that, when executed by processing circuitry, cause the processing circuitry to:

instruct a triangular spatial array of processing elements to perform a first matrix decomposition; and instruct the triangular spatial array of processing elements to perform a second matrix decomposition.

EXAMPLE EMBODIMENT 12. The article of manufacture of example embodiment 11, wherein the instructions cause the processing circuitry to instruct the triangular spatial array of processing elements to perform the first matrix decomposition on a batch of matrices.

EXAMPLE EMBODIMENT 13. The article of manufacture of example embodiment 12, wherein the instructions cause the processing circuitry to:

instruct a first buffer to send the batch of matrices to the triangular spatial array of processing elements to be processed at least partly in parallel; and instruct a delay alignment buffer to realign resulting matrices output by the triangular spatial array of processing elements.

EXAMPLE EMBODIMENT 14. The article of manufacture of example embodiment 11, wherein the instructions cause the processing circuitry to perform Cholesky decomposition, LU decomposition, Cholesky-based minimum mean square error (MMSE), Givens-Rotation QR based MMSE, or Gram-Schmidt QR decomposition as the first matrix decomposition and perform a different one of Cholesky decomposition, LU decomposition, Cholesky-based minimum mean square error (MMSE), Givens-Rotation QR based MMSE, or Gram-Schmidt QR decomposition as the second matrix decomposition.

EXAMPLE EMBODIMENT 15. The article of manufacture of any of example embodiments 11-14, wherein the instructions cause the processing circuitry to send an instruction having a data structure that includes an indication of a function to be performed and a time-to-live value, wherein the time-to-live value causes that instruction to be ignored once that instruction has propagated through processing elements of the processing element array more than indicated by the time-to-live value.

EXAMPLE EMBODIMENT 16. An integrated circuit comprising programmable spatial array processing circuitry comprising:

a buffer that outputs a batch of matrices;

a processing element array comprising a plurality of processing elements that sequentially propagate instructions to adjacent processing elements rather than store all of the instructions in respective instruction memories, wherein the processing element array is programmable to:

perform a first matrix decomposition on the batch of matrices when provided a first set of the instructions; and perform a second matrix decomposition on the batch of matrices when provided a second set of the instructions.

EXAMPLE EMBODIMENT 17. The integrated circuit of example embodiment 16, wherein the processing element array performs the first matrix decomposition or the second matrix decomposition on at least two of the batch of matrices at least partly in parallel.

EXAMPLE EMBODIMENT 18. The integrated circuit of example embodiments 16 or 17, wherein the processing element array comprises a processing element having a plurality of issue slots and a plurality of register files, wherein the at least two of the plurality of issue slots are programmable to operate in parallel to perform part of the first matrix decomposition or the second matrix decomposition.

EXAMPLE EMBODIMENT 19. The integrated circuit of example embodiments 16 or 17, wherein the processing element array outputs results from the first matrix decomposition or the second matrix decomposition staggered in time such that results corresponding to a first matrix of the batch of matrices overlap in time with results corresponding to a second matrix of the batch of matrices.

EXAMPLE EMBODIMENT 20. The integrated circuit of example embodiment 19, comprising a delay alignment buffer that aligns the results corresponding to the first matrix of the batch of matrices in time and aligns the results corresponding to the second matrix of the batch of matrices in time.

EXAMPLE EMBODIMENT 21. A method comprising:
using a triangular spatial array of processing elements to perform a first type of matrix decomposition; and
using the same triangular spatial array of processing elements to perform a second type of matrix decomposition.

EXAMPLE EMBODIMENT 22. The method of example embodiment 21, wherein using the triangular spatial array of processing elements to perform the first type of matrix decomposition comprises:
using a first buffer to send the batch of matrices to the triangular spatial array of processing elements to be processed at least partly in parallel; and
using a delay alignment buffer to realign resulting matrices output by the triangular spatial array of processing elements.

EXAMPLE EMBODIMENT 23. The method of example embodiment 21 or 22, wherein the first type of matrix decomposition comprises Cholesky decomposition, LU decomposition, Cholesky-based minimum mean square error (MMSE), Givens-Rotation QR based MMSE, or Gram-Schmidt QR decomposition and the second type of matrix decomposition comprises a different one of Cholesky decomposition, LU decomposition, Cholesky-based minimum mean square error (MMSE), Givens-Rotation QR based MMSE, or Gram-Schmidt QR decomposition.

EXAMPLE EMBODIMENT 24. A system comprising:
a triangular processing element array having an array of processing elements, wherein the triangular processing element array comprises:
means for performing a first type of matrix decomposition at a first time; and
means for performing a second type of matrix decomposition at a second time.

EXAMPLE EMBODIMENT 25. The system of example embodiment 24, comprising:
means for programming the triangular processing element array, wherein the processing elements do not include separate instruction memories that store more than one instruction.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims. Moreover, the techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. Circuitry comprising:
programmable spatial array processing circuitry comprising:
a processing element array having an array of processing elements, wherein the processing element array:
when programmed with first instructions, performs a first type of matrix decomposition; and
when programmed with second instructions, performs a second type of matrix decomposition; and
instruction memory that provides a portion of the first instructions or a portion of the second instructions sequentially to one processing element of a row of processing elements to sequentially propagate to other processing elements of the row of processing elements,
wherein the array of processing elements comprises:
a first processing element having a first architecture that includes a plurality of issue slots; and
a second processing element having a second architecture different from the first architecture that includes an arithmetic logic unit (ALU) configurable to perform multiply-accumulate operations.

2. The circuitry of claim 1, wherein the array of processing elements has a triangular arrangement.

3. The circuitry of claim 1, wherein the array of processing elements comprises at least three different types of processing elements.

4. The circuitry of claim 3, wherein the at least three different types of processing elements comprise:
a first diagonal processing element type that only receives data from above it in the array and only outputs data to a first side in the array;
a second internal processing element type that only receives data from above it in the array and from a second side of it in the array and only outputs data to the first side of it in the array and down from it in the array; and
a third vector processing element type that only receives data from above it in the array and from the second side of it in the array and outputs results of the processing element array.

5. The circuitry of claim 3, wherein the instruction memory comprises:
a first instruction memory that stores instructions for all of the processing elements of a first type of the at least three different types of processing elements;
a second instruction memory that stores instructions for all of the processing elements of a second type of the at least three different types of processing elements; and
a third instruction memory that stores instructions for all of the processing elements of a third type of the at least three different types of processing elements.

6. The circuitry of claim 1, wherein the one processing element of the row of processing elements and the other processing elements of the row of processing elements do not contain instruction memory to hold more than one instruction at a time.

7. The circuitry of claim 1, wherein the first type of matrix decomposition comprises one of a Cholesky decomposition, a QR decomposition, or a lower-upper (LU) decomposition, and wherein the second type of matrix decomposition comprises a type of matrix decomposition that is different than the first type of decomposition.

8. The circuitry of claim 1, comprising host processing circuitry configurable to perform a task that involves performing the first type of matrix decomposition and cause the processing element array to be programmed with the first instructions.

9. The circuitry of claim 8, comprising a plurality of antennas, wherein the host processing circuitry and the programmable spatial array processing circuitry are configured to perform the first type of matrix decomposition or the second type of matrix decomposition to carry out a multiple-input multiple-output (MIMO) computation.

10. An article of manufacture comprising one or more tangible, non-transitory, machine readable media comprising instructions that, when executed by processing circuitry, cause the processing circuitry to:
   instruct a triangular spatial array of processing elements to perform a first type of matrix decomposition; and
   instruct the same triangular spatial array of processing elements to perform a second type of matrix decomposition,
   wherein the first type of matrix decomposition comprises one of a Cholesky decomposition, a QR decomposition, or a lower-upper (LU) decomposition, and wherein the second type of matrix decomposition comprises a type of matrix decomposition that is different than the first type of decomposition.

11. The article of manufacture of claim 10, wherein the instructions cause the processing circuitry to instruct the triangular spatial array of processing elements to perform the first matrix decomposition on a batch of matrices.

12. The article of manufacture of claim 11, wherein the instructions cause the processing circuitry to:
   instruct a first buffer to send the batch of matrices to the triangular spatial array of processing elements to be processed at least partly in parallel; and
   instruct a delay alignment buffer to realign resulting matrices output by the triangular spatial array of processing elements.

13. The article of manufacture of claim 10, wherein the instructions cause the processing circuitry to send an instruction having a data structure that includes an indication of a function to be performed and a time-to-live value, wherein the time-to-live value causes that instruction to be ignored once that instruction has propagated through processing elements of the processing element array more than indicated by the time-to-live value.

14. An integrated circuit comprising:
   a buffer that outputs a batch of matrices; and
   a processing element array comprising a plurality of processing elements that sequentially propagate instructions to adjacent processing elements rather than store all the instructions in respective instruction memories, wherein the processing element array is programmable to:
      perform a first matrix decomposition on the batch of matrices when provided a first set of the instructions; and
      perform a second matrix decomposition on the batch of matrices when provided a second set of the instructions.

15. The integrated circuit of claim 14, wherein the processing element array performs the first matrix decomposition or the second matrix decomposition on at least two of the batch of matrices at least partly in parallel.

16. The integrated circuit of claim 14, wherein the processing element array comprises a processing element having a plurality of issue slots and a plurality of register files, wherein at least two of the plurality of issue slots are programmable to operate in parallel to perform part of the first matrix decomposition or the second matrix decomposition.

17. The integrated circuit of claim 14, wherein the processing element array outputs results from the first matrix decomposition or the second matrix decomposition staggered in time such that results corresponding to a first matrix of the batch of matrices overlap in time with results corresponding to a second matrix of the batch of matrices.

18. The integrated circuit of claim 17, further comprising a delay alignment buffer that aligns the results corresponding to the first matrix of the batch of matrices in time and aligns the results corresponding to the second matrix of the batch of matrices in time.

19. A method comprising:
   using a triangular spatial array of processing elements to perform a first type of matrix decomposition; and
   using the same triangular spatial array of processing elements to perform a second type of matrix decomposition,
   wherein the first type of matrix decomposition comprises one of a Cholesky decomposition, a QR decomposition, or a lower-upper (LU) decomposition, and wherein the second type of matrix decomposition comprises a type of matrix decomposition that is different than the first type of decomposition.

20. The method of claim 19, wherein using the triangular spatial array of processing elements to perform the first type of matrix decomposition comprises:
   using a first buffer to send a batch of matrices to the triangular spatial array of processing elements to be processed at least partly in parallel; and
   using a second buffer to realign resulting matrices output by the triangular spatial array of processing elements.

21. Circuitry comprising:
   programmable spatial array processing circuitry comprising:
      a processing element array having an array of processing elements comprising at least three different types of processing elements, wherein the processing element array:
         when programmed with first instructions, performs a first type of matrix decomposition; and
         when programmed with second instructions, performs a second type of matrix decomposition; and
      instruction memory that provides a portion of the first instructions or a portion of the second instructions sequentially to one processing element of a row of processing elements to sequentially propagate to other processing elements of the row of processing elements,
      wherein the instruction memory comprises:
         a first instruction memory that stores instructions for all of the processing elements of a first type of the at least three different types of processing elements;
         a second instruction memory that stores instructions for all of the processing elements of a second type of the at least three different types of processing elements; and
         a third instruction memory that stores instructions for all of the processing elements of a third type of the at least three different types of processing elements.

22. An article of manufacture comprising one or more tangible, non-transitory, machine readable media comprising instructions that, when executed by processing circuitry, cause the processing circuitry to:
   instruct a triangular spatial array of processing elements to perform a first type of matrix decomposition;
   instruct the same triangular spatial array of processing elements to perform a second type of matrix decomposition; and send an instruction having a data structure that includes an indication of a function to be performed and a time-to-live value, wherein the time-to-live value causes that instruction to be ignored once that instruction has propagated through processing elements of the processing element array more than indicated by the time-to-live value.

* * * * *